(12) United States Patent
Yim et al.

(10) Patent No.: US 10,123,060 B2
(45) Date of Patent: Nov. 6, 2018

(54) METHOD AND APPARATUS FOR PROVIDING CONTENTS

(71) Applicant: Samsung Electronics Co., Ltd, Gyeonggi-do (KR)

(72) Inventors: Saemee Yim, Gyeonggi-do (KR); Bokun Choi, Seoul (KR); Youngtae Jin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 670 days.

(21) Appl. No.: 14/791,080

(22) Filed: Jul. 2, 2015

(65) Prior Publication Data

US 2016/0007055 A1  Jan. 7, 2016

(30) Foreign Application Priority Data

Jul. 4, 2014  (KR) ........................ 10-2014-0083574

(51) Int. Cl.
| | | |
|---|---|---|
| *G06F 17/00* | (2006.01) |
| *H04N 21/235* | (2011.01) |
| *G06F 17/30* | (2006.01) |
| *G09B 15/02* | (2006.01) |
| *H04N 21/436* | (2011.01) |
| *H04N 21/4788* | (2011.01) |
| *G06Q 10/10* | (2012.01) |
| *G09B 5/10* | (2006.01) |
| *G09B 5/06* | (2006.01) |
| *G09B 7/02* | (2006.01) |
| *G09B 19/00* | (2006.01) |
| *G10H 1/00* | (2006.01) |
| *H04N 21/266* | (2011.01) |

(52) U.S. Cl.
CPC ..... *H04N 21/2353* (2013.01); *G06F 17/3028* (2013.01); *G06Q 10/10* (2013.01); *G09B 5/06* (2013.01); *G09B 5/10* (2013.01); *G09B 7/02* (2013.01); *G09B 15/023* (2013.01); *G09B 19/00* (2013.01); *G10H 1/0008* (2013.01); *G10H 1/0058* (2013.01); *H04N 21/43615* (2013.01); *H04N 21/4788* (2013.01); *G10H 2220/015* (2013.01); *H04N 21/266* (2013.01)

(58) Field of Classification Search
CPC .................................................. G06F 17/3028
See application file for complete search history.

(56) References Cited

U.S. PATENT DOCUMENTS

| | | | | |
|---|---|---|---|---|
| 9,159,298 | B2 * | 10/2015 | Han | .................. G06F 3/1454 |
| 2004/0189664 | A1 * | 9/2004 | Frisken | ................. G06T 11/001 |
| | | | | 345/611 |

(Continued)

FOREIGN PATENT DOCUMENTS

| | | |
|---|---|---|
| KR | 1020110006201 A | 1/2011 |
| KR | 20120015383 A | 2/2012 |
| KR | 20130061501 A | 6/2013 |

*Primary Examiner* — Laurie A Ries

(57) ABSTRACT

Disclosed are a method and an apparatus for providing contents. The method includes: analyzing an attribute of contents and generating a mapping table for mapping a first region of the contents and a second region of the contents associated with the first region; and transmitting content information about the second region related to the mapping table to a second electronic apparatus and outputting the first region of the contents through an output unit.

18 Claims, 22 Drawing Sheets

(56) References Cited

U.S. PATENT DOCUMENTS

| | | | | |
|---|---|---|---|---|
| 2005/0021857 | A1* | 1/2005 | Balassanian | H04L 12/66 |
| | | | | 709/245 |
| 2006/0041891 | A1* | 2/2006 | Aaron | G09B 7/00 |
| | | | | 719/315 |
| 2006/0171325 | A1* | 8/2006 | Jung | H04W 4/029 |
| | | | | 370/252 |
| 2007/0136327 | A1* | 6/2007 | Kim | H04L 67/04 |
| 2008/0109477 | A1* | 5/2008 | Lue | G06F 17/30905 |
| 2009/0235161 | A1* | 9/2009 | Williams | G06F 17/2247 |
| | | | | 715/255 |
| 2009/0241015 | A1* | 9/2009 | Bender | G06F 17/30038 |
| | | | | 715/202 |
| 2010/0329574 | A1* | 12/2010 | Moraleda | G06F 17/30011 |
| | | | | 382/217 |
| 2012/0019367 | A1* | 1/2012 | Roth | G08C 17/02 |
| | | | | 340/10.6 |
| 2012/0304063 | A1* | 11/2012 | Weng | G06F 3/005 |
| | | | | 715/716 |
| 2013/0013747 | A1* | 1/2013 | Cranor | H04L 67/1034 |
| | | | | 709/219 |
| 2013/0097627 | A1* | 4/2013 | Hwang | H04H 60/73 |
| | | | | 725/25 |
| 2014/0208244 | A1* | 7/2014 | Yoo | G06F 17/30997 |
| | | | | 715/764 |
| 2014/0250479 | A1* | 9/2014 | Lee | H04N 7/08 |
| | | | | 725/110 |

* cited by examiner

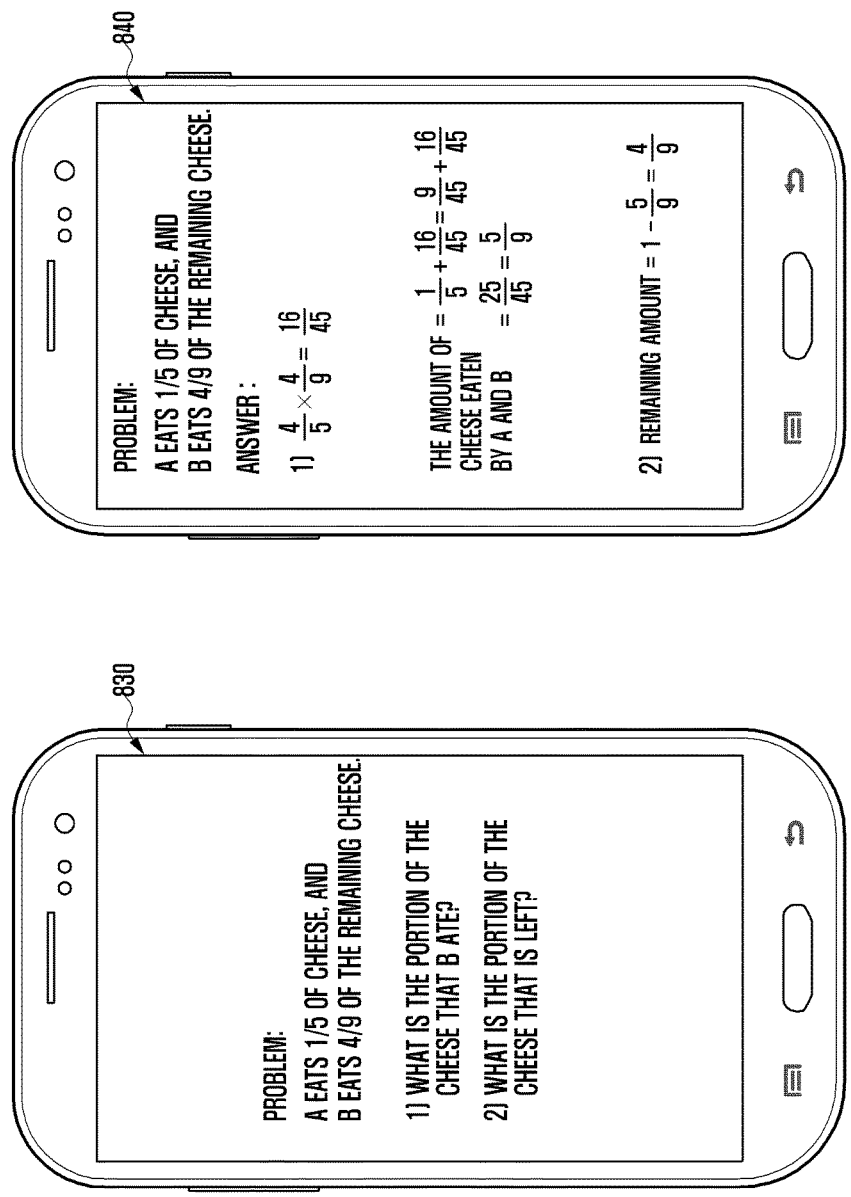

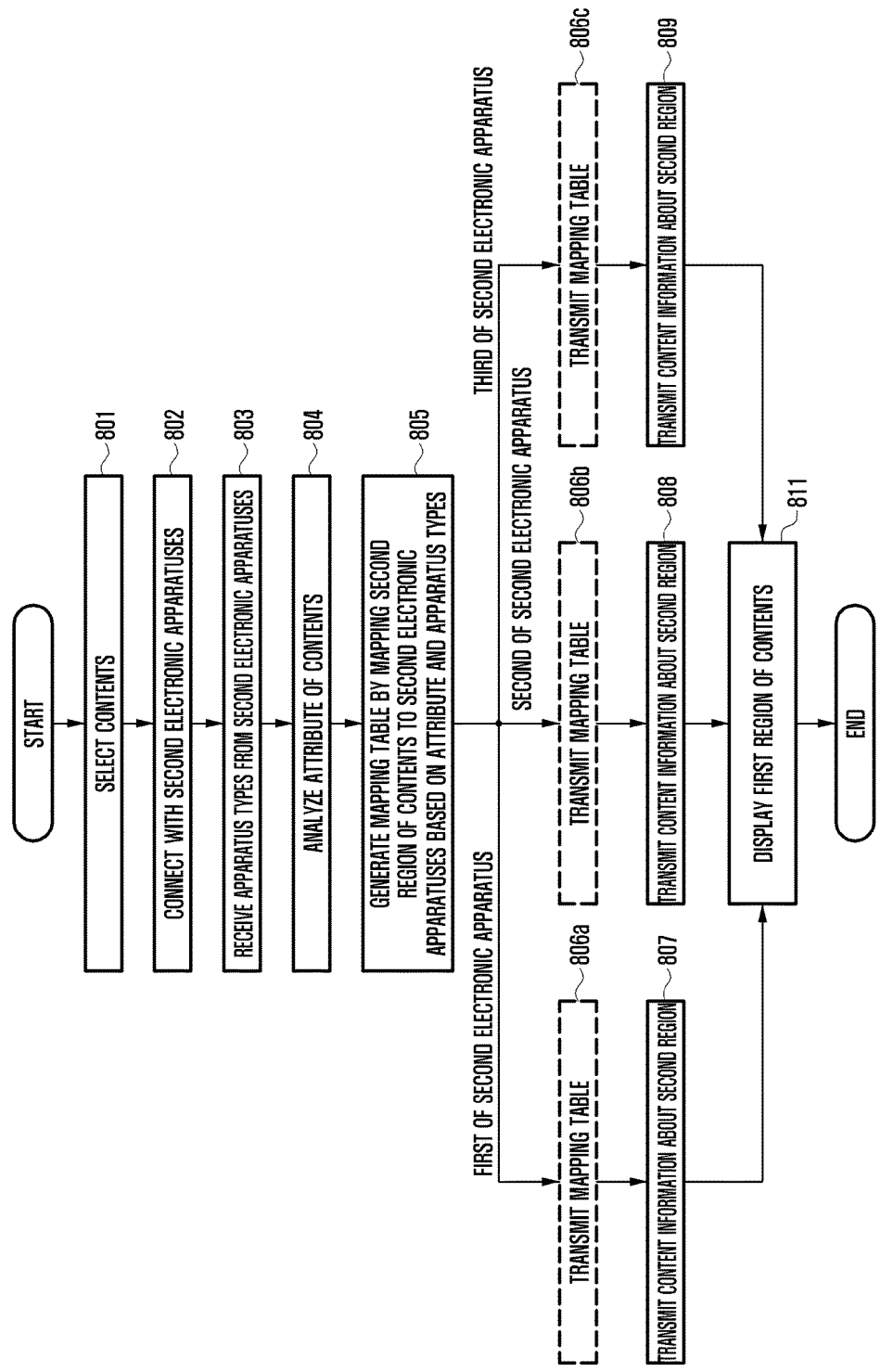

METHOD AND APPARATUS FOR PROVIDING CONTENTS

CROSS-REFERENCE TO RELATED APPLICATION AND CLAIM OF PRIORITY

The present application is related to and claims the benefit under 35 U.S.C. § 119(a) of Korean Patent Application No. 10-2014-0083574, filed on Jul. 4, 2014, which is hereby incorporated by reference for all purposes as if fully set forth herein.

TECHNICAL FIELD

The present disclosure relates to a method of providing contents to a plurality of electronic devices.

BACKGROUND

An N-screen means a technology (or service) for enabling a user to "continuously" enjoy one multimedia content (movie, music, and the like) through N number of devices. For example, in the N-screen, a user may "continuously watch" broadcasting or a movie, which the user watched through a TV at home, through a smart phone or a tablet PC (or a notebook computer) while being outside. The user may begin viewing, from a scene following the last scene viewed through a predetermined device, through N number of Information Technology (IT) devices. For reference, viewing one content through multiple devices is referred to as "One Source Multi Use (OSMU)."

Further, a user may view additional information, for example, a non-published image or filming site/prop information, related to a drama through a smart phone or a tablet PC while watching the drama through a TV, as well as continuously watch broadcasting or a movie. For reference, acquiring various information about a specific topic is referred to as "Adaptive Source Multi Device (ASMD)."

In the ASMD scheme, contents are produced so as to transmit additional contents to various devices from a planning stage. In order to provide various user experiences in an N-screen scenario, contents need to be produced in an N-screen form, but the OSMU scheme is capable of providing an expanded user experience by using existing supplied contents, so that it is easier to implement the OSMU scheme than the ASMD scheme, and a use method of the OSMU scheme is simple.

SUMMARY

To address the above-discussed deficiencies, it is a primary object to provide an electronic apparatus configured to implement: analyzing an attribute of contents and generating a mapping table for mapping a first region of the contents and a second region of the contents associated with the first region; and transmitting content information about the second region related to the mapping table to a second electronic apparatus and outputting the first region of the contents through an output unit.

In accordance with embodiments of the present disclosure, an electronic apparatus is provided. The electronic apparatus includes: a controller configured to analyze an attribute of contents and generate a mapping table for mapping a first region of the contents and a second region of the contents associated with the first region; a communication unit configured to transmit content information about the second region related to the mapping table to a second electronic apparatus; and an output unit configured to output the contents.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A to 8C illustrate a process of outputting the same contents to a plurality of second electronic apparatuses according to various embodiments of the present disclosure;

DETAILED DESCRIPTION

Figure 1:
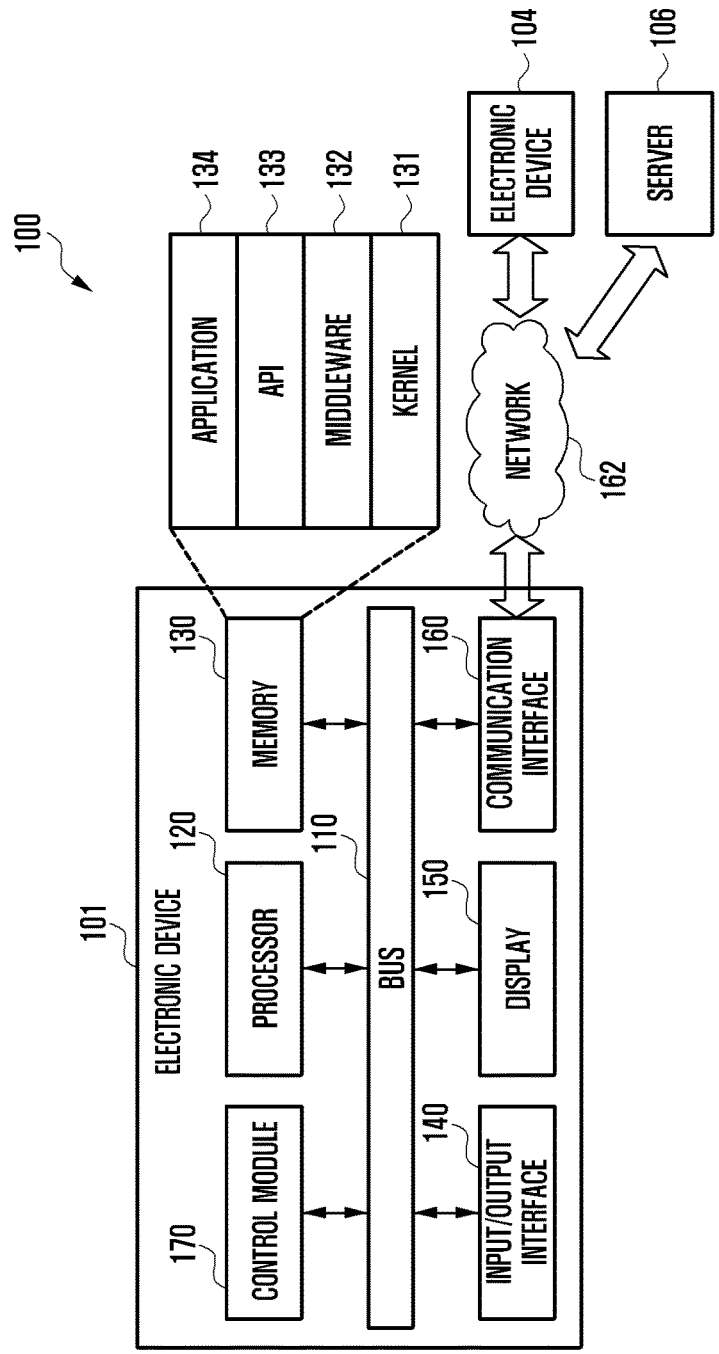
FIG. 1 illustrates a network environment including an electronic apparatus according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, certain embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an example illustrating the principles of the present disclosure and is not intended to limit the present disclosure to the specific embodiments illustrated. The same reference numbers are used throughout the drawings to refer to the same or like parts.

The expression "comprising" or "may comprise" used in the present disclosure indicates the presence of a corresponding function, operation, or element and does not limit additional at least one function, operation, or element. Further, in the present disclosure, the term "comprise" or "have" indicates the presence of a characteristic, numeral, step, operation, element, component, or combination thereof described in the specification and does not exclude presence or addition of at least one other characteristic, numeral, step, operation, element, component, or combination thereof.

In the present disclosure, the expression "or" includes any combination or the entire combination of together listed words. For example, "A or B" may include A, B, or A and B.

The expressions "first" and "second" in the present disclosure may represent various elements of the present disclosure, but do not limit corresponding elements. For example, the expressions do not limit order and/or importance of corresponding elements. The expressions may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

The term "module" used in embodiments of the present disclosure may refer to, for example, a "unit" including one of hardware, software, and firmware, or a combination of two or more thereof. The term "module" may be interchangeable with a term such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which have been known or are to be developed.

Terms used in the present disclosure are not intended to limit the present disclosure but to illustrate certain embodiments of the present disclosure. When used in a description of the present disclosure and the appended claims, a singular form includes a plurality of forms unless it is explicitly differently represented.

Unless differently defined, entire terms including a technical term and a scientific term used herein have the same meaning as a meaning that may be generally understood by a person of ordinary skill in the art. It should be understood that generally using terms defined in a dictionary have a meaning corresponding to that of a context of related technology and are not intended to have an ideal or excessively formal meaning unless explicitly defined.

According to embodiments of the present disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to embodiments of the present disclosure, an electronic device may be a smart home appliance that involves a communication function. For example, an electronic device may be a TV, a Digital Video Disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to embodiments of the present disclosure, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), a Flight Data Recorder (FDR), a car infotainment device, electronic equipment for ship (e.g., a marine navigation system, a gyrocompass, etc.), avionics, security equipment, or an industrial or home robot.

According to embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are only examples and not to be considered as a limitation of the present disclosure.

Hereinafter, an electronic device according to various embodiments will be described with reference to the accompanying drawings. The term "user" to be used herein may refer to a person or machine (e.g., an artificial intelligence apparatus or system) using an electronic device.

The OSMU scheme in the N-screen environment is a method of identically reproducing one content through another device, and is related to a method of enabling a plurality of users to view the same and synchronized image. The OSMU scheme is appropriate for simultaneously using one content through screens of a plurality of devices, but in the OSMU scheme, there is no consideration of a method of solving a user's need for a method of displaying synchronized different images for one content through a plurality of devices.

FIG. 1 illustrates a network environment 100 including therein an electronic device 101 in accordance with embodiments of the present disclosure. Referring to FIG. 1, the electronic device 101 includes, but is not limited to, a bus 110, a processor 120, a memory 130, an input/output interface 140, a display 150, a communication interface 160, and an application control module 170.

The bus 110 is a circuit designed for connecting the above-discussed elements and communicating data (e.g., a control message) between such elements.

The processor 120 receives commands from the other elements (e.g., the memory 130, the input/output interface 140, the display 150, the communication interface 160, or the application control module 170, etc.) through the bus 110, interprets the received commands, and performs the arithmetic or data processing based on the interpreted commands.

The memory 130 stores therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 controls or manages system resources (e.g., the bus 110, the processor 120, or the memory 130, etc.) used for performing operations or functions of the other programming modules, e.g., the middleware 132, the API 133, or the application 134. Additionally, the kernel 131 offers an interface that allows the middleware 132, the API 133 or the application 134 to access, control or manage individual elements of the electronic device 101.

The middleware 132 performs intermediation by which the API 133 or the application 134 communicates with the kernel 131 to transmit or receive data. Additionally, in connection with task requests received from the applications 134, the middleware 132 performs a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133, which is an interface for allowing the application 134 to control a function provided by the kernel 131 or the middleware 132, may include, for example, at least one interface or function (e.g., a command) for file control, window control, image processing, text control, and the like.

According to embodiments of the present disclosure, the application 134 may include an short message service (SMS)/multimedia messaging service (MMS) application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device 104. Alternatively, the notification relay application may receive notification information from an external electronic device 104 and offer it to a user. The device management application may manage (e.g., install, remove or update) a certain function (a turn-on/turn-off of an external electronic device (or some components thereof), or an adjustment of brightness (or resolution) of a display) of any external electronic device 104 communicating with the electronic device 101, a certain application operating at such an external electronic device, or a certain service (e.g., a call service or a message service) offered by such an external electronic device.

According to embodiments of the present disclosure, the application 134 may include a specific application specified depending on attributes (e.g., a type) of an external electronic device 104. For example, in case an external electronic device is an MP3 player, the application 134 may include a specific application associated with a play of music. As another example, in case an external electronic device is a portable medical device, the application 134 may include a specific application associated with a health care. In embodiments of the present disclosure, the application 134 may include at least one of an application assigned to the electronic device 101 or an application received from an external electronic device (e.g., the server 106 or the external electronic device 104).

The input/output interface 140 delivers commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 displays thereon various kinds of information (e.g., multimedia data, text data, etc. to a user.

The communication interface 160 performs communication between the electronic device 101 and the external electronic device 104 or the server 106. For example, the communication interface 160 may communicate with any external device by being connected with a network 162 through a wired or wireless communication. A wireless communication may include, but is not limited to, at least one of Wireless Fidelity (WiFi), Bluetooth (BT), Near Field Communication (NFC), Global Positioning System (GPS), or a cellular communication (e.g., Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), or Global System for Mobile Communication (GSM), etc.). A wired communication may include, but is not limited to, at least one of Universal Serial Bus (USB), High Definition Multimedia interface (HDMI), Recommended Standard 232 (RS-232), or Plain Old Telephone Service (POTS).

According to embodiments of the present disclosure, the network 162 may be a communication network, which may include at least one of a computer network, an internet, an internet of things, or a telephone network. According to embodiments of the present disclosure, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

A control module 170 may analyze an attribute of contents, and generate a mapping table for mapping a first region of the contents with a second region of the contents associated with the first region. The contents may be configured by at least one of text, an image, an audio, a video, and a voice. The contents may be contents stored in the memory 130 or downloaded through streaming services or downloading services. The attribute of the contents may be at least one of the type of data included in the contents, a page number of the contents, a layer of the contents, and the number of measures of the contents. The control module 170 may obtain the attribute of the contents from the contents, analyze the contents and generate the attribute of the contents, or receive a setting of the attribute of the contents from the user. In the mapping table, a plurality of regions included in the contents may be classified for each attribute of the contents, and the respective classified regions are mapped to electronic apparatuses which are to output the respective classified regions.

The mapping table may include a reference number for each region of the contents. In order to generate the mapping table, an electronic apparatus 101 may be connected with a second electronic apparatus. The second electronic apparatus is an external apparatus, and such as the external electronic apparatus 104 in FIG. 1. The second electronic apparatus may be a display device, such as a smart phone, a tablet PC, and a TV, similar to the electronic apparatus 101. A connection between the electronic apparatus 101 and the second electronic apparatus may mean a state where the electronic apparatus 101 and the second electronic apparatus may transceive data with each other. For example, when the contents are an "Ebook," the control module 170 may classify an odd-numbered page of a book into the first region and an even-numbered page of a book into the second region, and map the first region to the electronic apparatus 101 and the second region to the second electronic apparatus to generate the mapping table. In this case, output times of the mapped first region and the mapped second region are synchronized.

The communication interface 160 may transmit content information about the second region related to the mapping table to the second electronic apparatus. The contents information about the second region may be the contents for the second region, or a reference number of the contents for the second region. The second electronic apparatus may output the second region of the contents. The input/output interface 140 may output the first region of the contents. The output may mean an output of a sound associated with the first region of the contents through a speaker, or a display of the first region of the contents through the display 150.

According to various embodiments of the present disclosure, the input/output interface 140 may receive a selection of the contents. The control module 170 may detect whether the second electronic apparatus is connected, and map the first region of the contents or the second region of the contents to the connected second electronic apparatus based on an attribute of the selected contents to generate the mapping table. For example, when the number of connected second electronic apparatuses is two or more, the communication interface 160 may receive the type of the apparatus from each of the second electronic apparatuses. The control module 170 may map the first region of the contents or the second region of the contents to each second electronic apparatus based on the attribute of the contents and the type of each apparatus to generate the mapping table.

According to various embodiments of the present disclosure, when the contents are related to a music score, the control module 170 may analyze musical instruments included in the music score. The communication interface 160 may receive the type of apparatus from each of the second electronic apparatuses. The control module 170 may map each second electronic apparatus to the analyzed musical instrument of the music score based on the type of each apparatus to generate the mapping table. The control module 170 may analyze a sound and confirm a measure of the music score related to the sound. The communication interface 160 may transmit content information about the measure to each second electronic apparatus. The display 150 may display the music score related to the measure. The second apparatus may also display the music score related to the measure.

The communication interface 160 may transmit the mapping table to the second apparatus. In this case, the second electronic apparatus may store the stored contents and the mapping table in the memory 130 of the electronic apparatus 101. In this case, the second electronic apparatus may receive a reference number for the second region as the received contents information about the second region. The second electronic apparatus may output the second region of the contents based on the mapping table and the reference number for the second region. That is, the second electronic apparatus may output the second region in accordance with the output of the first region by the electronic apparatus 101. For example, the second electronic apparatus may output the second region and the first region at the same time, or output the second region after or before the first region.

According to various embodiments of the present disclosure, the display 150 may display the first region of the contents. When the second electronic apparatus is located within a predetermined distance, the communication interface 160 may transmit the content information about the second region, which is not displayed on the display 150, to the second electronic apparatus. In an embodiment in which the non-displayed second region is displayed in the second electronic apparatus, the electronic apparatuses may be connected by a slightly different method from that of an embodiment in which two different regions are displayed in the electronic apparatuses, respectively.

For example, the first electronic apparatus may be in contact with the second electronic apparatus, or the predetermined distance may be shorter than a distance between two electronic apparatuses in the embodiment in which the two electronic apparatuses display two different regions, respectively. The second electronic apparatus may display the second region of the contents. The input/output interface 140 may detect an input of a user, and the display 150 may display a third region of the contents in response to the input of the user. The communication interface 160 may transmit content information about a fourth region of the contents, which is not displayed on the display 150, to the second electronic apparatus. The second electronic apparatus may display the fourth region of the contents. For example, the second electronic apparatus may output the fourth region and the third region at the same time, or output the fourth region after or before the third region.

An object of various embodiments of the present disclosure is to provide a method and an apparatus for providing contents, by which a portable terminal and a display device display different images and perform synchronized operations, on that one content may be variously utilized according to a use purpose.

Figure 2:
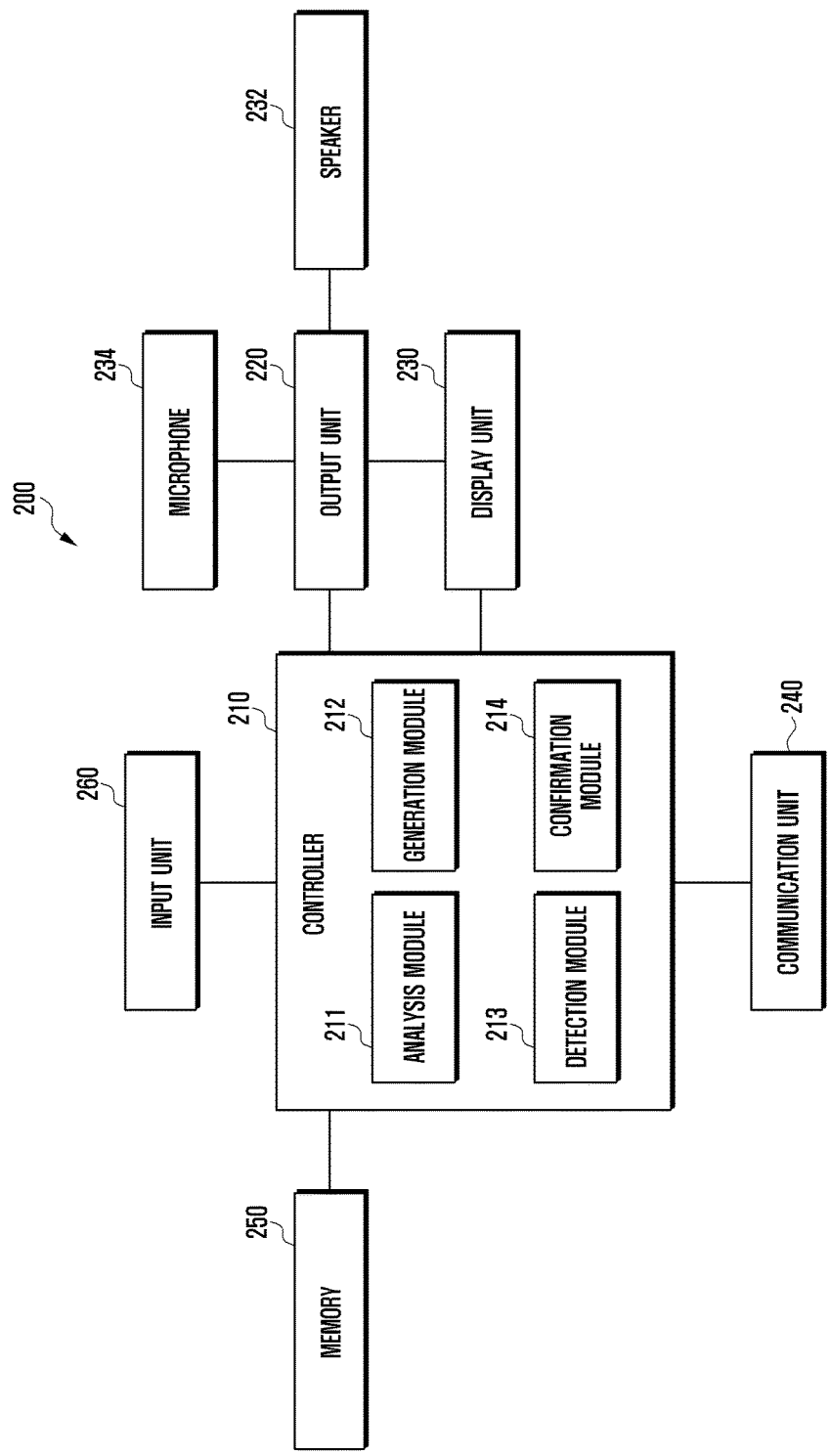
FIG. 2 illustrates an electronic apparatus according to various embodiments of the present disclosure.

FIG. 2 illustrates an electronic device according to various embodiments of the present disclosure.

Referring to FIG. 2, an electronic apparatus 200 may include a controller 210, an output unit 220, a display unit 230, a communication unit 240, a memory 250, and an input unit 260.

The input unit 260 may receive a selection of contents from a user. The contents may be configured by at least one of text, an image, an audio, a video, and a voice. The contents may be contents stored in a memory (for example, the memory 130 of FIG. 1 or the memory 250 of FIG. 2) or downloading services through streaming services or downloaded services. The input unit 260 (for example, the input/output interface 140 of FIG. 1) may include a plurality of keys for receiving number or character information and setting various functions. The keys may include a menu opening key, a screen on/off key, an electric power source on/off key, a volume control key, and the like. The input unit 260 may generate a key event related to user's setting and a function control of the second electronic apparatus 200 and transmits the generated key event to the controller 210. The key event may include an electric power source on/off event, a volume control event, a screen on/off event, a shutter event, and the like. The controller 210 controls the configurations in response to the key event. In the meantime, the keys of the input unit 260 may be referred to as hard keys, and virtual keys displayed on the display unit 230 may be referred to as soft keys.

The controller 210 (for example, the control module 170 or the processor 120 of FIG. 1) controls a general operation of the electronic apparatus 200 and a signal flow between internal elements of the electronic apparatus 200, performs a function of processing data, and controls a power supply from a battery to the elements. The controller 210 includes a Central Processing Unit (CPU) and a Graphic Processing Unit (CPU). The CPU is a core control unit of a computer system which performs calculations and comparisons of data, the interpretation and execution of instructions, and the like. The CPU is a graphic control unit which performs calculations and comparisons of graphic-related data, and the interpretation and execution of instructions, and the like, instead of the CPU. Each of the CPU and the CPU may be integrated into one package in which two or more independent cores (for example, quad-core) are implemented by a single integrated circuit. Further, the CPU and the GPU may be a System on Chip (SoC). Further, the CPU and the CPU may be packaged as a multi-layer. Meanwhile, a configuration including the CPU and the GPU may be referred to as an "Application Processor (AP)."

The controller 210 may include an analysis module 211, a generation module 212, a detection module 213, and a confirmation module 214. The detection module 213 may detect whether the second electronic apparatus is connected with the second electronic apparatus. The analysis module 211 may analyze at least one of the type of data included in the contents, a page number of the contents, a layer of the contents, and the number of measures of the contents as an attribute of the selected contents. For example, the type of data may be at least one of text, an image, a video, a symbol, an icon, and a sign. For example, the analysis module 211 may analyze the contents, and obtain or generate a fact that the contents are formed of an image and text as the attribute. The page number may be at least one of the number of pages, an even number, and an odd number.

For example, when the contents are an "Ebook," the analysis module 211 may analyze a page number of the contents. The analysis module 211 may analyze the contents, and obtain or generate the attribute that the contents include the specific number of pages, and the contents are configured in a left page or a right page at the attribute. Otherwise, the analysis module 211 may analyze the contents, and obtain or generate a fact that the contents are formed of odd-numbered pages or even-numbered pages as the attribute. In the layer of the contents, data is divided for each layer, and the layer may be divided according to the type of data. For example, the analysis module 211 may analyze the contents, and obtain or generate a fact that an image is formed as a first layer and text is formed as a second layer as the attribute. The number of measures of the contents may be a unit of outputting the contents. For example, when the analysis module 211 analyzes the contents and the contents are a music score, the analysis module 211 may obtain or generate a total number of measures including the music score and a fact that the number of measures to be output once is 10 as the attribute.

Otherwise, the analysis module 211 may also receive a setting of the attribute from the user. When the analysis module 211 cannot obtain the attribute from the contents or cannot obtain the attribute even though the contents are analyzed, the analysis module 211 may receive a setting of the attribute from the user. Otherwise, when the analysis module 211 receives a setting of the attribute from the user even though the attribute has been obtained, the analysis module 211 may put the set attribute before the obtained attribute. Otherwise, the analysis module 211 may also receive a setting of a priority between the obtained attribute and the set attribute from the user.

The generation module 212 may generate a mapping table for mapping a first region of the contents with a second region of the contents associated with the first region based on the attribute of the contents. In the mapping table, a plurality of regions included in the contents may be classified for each attribute of the contents, and the respective classified regions are mapped to electronic apparatuses which are to output the respective classified regions. For example, the mapping table may also include information about the contents itself, and a reference number for identifying the region included in the contents. The mapping table may include a reference number of the first region and a reference number of the second region. The generated mapping table may be stored in the memory 250. In order to generate the mapping table, the electronic apparatus 200 may be connected with the second electronic apparatus (for example, the electronic apparatus 104 of FIG. 1). The second electronic apparatus may be a display device, such as a smart phone, a tablet PC, and a TV, similar to the electronic apparatus 101. A connection between the electronic apparatus 200 and the second electronic apparatus may mean a state where the electronic apparatus 200 and the second electronic apparatus may transceive data with each other.

The generation module 212 may map the first region of the contents or the second region of the contents to the connected second electronic apparatus based on the attribute of the contents and generate the mapping table. Hereinafter, Tables 1 and 2 provide an example in which the electronic apparatus 200 and the second electronic apparatus are connected one-to-one.

TABLE 1

| Mapping Table | |
|---|---|
| First region | Second region |
| Image 1 | Text 1 |
| Image 2 | Text 2 |
| Image 3 | Text 3 |
| Image 4 | Text 4 |

Referring to Table 1, when the analyzed contents are formed of an image and text, the generation module 212 may classify a region including the image of the contents into a first region and a region including the text of the contents into a second region. In this case, the first region may be temporally or contextually associated with the second region. For example, image 1 is associated with text 1, image 2 is associated with text 2, and image 3 is associated with text 3. The generation module 212 may generate the mapping table by mapping the first region to the electronic apparatus 200 and mapping the second region to the second electronic apparatus.

TABLE 2

| Mapping Table | |
|---|---|
| First region | Second region |
| Page 1 | Page 2 |
| Page 3 | Page 4 |
| Page 5 | Page 6 |
| Page 7 | Page 8 |

Referring to Table 2, when the analyzed contents are an "Ebook," the generation module 212 may classify odd-numbered pages of the contents into a first region and even-numbered pages of the contents into a second region. In this case, the first region may be temporally or contextually associated with the second region. For example, page 1 is associated with page 2, page 3 is associated with page 4, and page 5 is associated with page 6. The generation module 212 may generate the mapping table by mapping the first region to the electronic apparatus 200 and mapping the second region to the second electronic apparatus.

Similar to Table 1, the generation module 212 may generate the mapping table by classifying a first layer of the contents into a first region and classifying a second layer of the contents into a second region, and mapping the first region to the electronic apparatus 200 and mapping the second region to the second electronic apparatus. In this case, an image may be included in the first layer and text may be included in the second layer.

The communication unit 240 (for example, the communication interface 160 of FIG. 1) may transmit content information about the second region related to the mapping table to the second electronic apparatus. The communication unit 240 may transmit the content information about the second region to the second electronic apparatus by any one of Digital Living Network Alliance (DLNA), Allshare, and miracast of WiFi Direct. The communication unit 240 may perform a voice call, a video call, or data communication with an external device through a network under the control of the controller 210. The communication unit 240 includes a wireless frequency transmission unit for up converting and amplifying a frequency of a transmitted signal, and a wireless frequency reception unit for down converting and low-noise amplifying a frequency of the received signal. Further, the communication unit 240 includes a mobile communication module (for example, a third-generation mobile communication module, a 3.5-generation mobile communication module, a fourth-generation mobile communication module), a digital broadcasting module (for example, a DMB module), and a short-range communication module (for example, a WiFi module, a Bluetooth module, and a Near Field Communication (NFC) module).

The output unit 220 may output the first region of the contents under the control of the controller 210. The output unit 220 may include a display unit 230 for displaying an image and a speaker 232 for outputting a sound. That is, the display unit 230 may display the first region of the contents. The speaker 232 may output a sound corresponding to the first region of the contents. The display unit 230 and the speaker 232 may output the image and the sound simultaneously or with a time difference according to the first region of the contents. The output unit 220 may include a microphone 234 (MIC) and a speaker 232 (SPK). The output unit 220 inputs and outputs an audio signal (for example, voice data) for a voice recognition, a voice recording, a digital recording, and a call by combining the speaker SPK and the microphone MIC. The output unit 220 receives an audio signal from the controller 210, digital-to-analog (D/A) converts the received audio signal to an analog signal, amplifies the converted signal, and outputs the amplified signal to the speaker SPK. The output unit 220 analog-to-digital (A/D) converts an audio signal received from the microphone MIC into a digital signal, and provides the converted signal to the controller 210. The speaker SPK converts an audio signal into a sound wave, and outputs the sound wave. The microphone MIC converts sound waves transferred from a user or other sound sources into audio signals.

According to various embodiments of the present disclosure, the output unit 220 may output the first region through the display unit 230 or the speaker 232, and the controller 210 may search for a second region matched with the first region in the mapping table stored in the memory 250 to transmit content information about the second region to the second electronic apparatus, and the second electronic apparatus may output the received second region. That is, the communication unit 240 may transmit the second region of the contents as the content information. The second electronic apparatus may receive the second region of the contents and output the second region. In this case, the second electronic apparatus may not store the contents in the memory, but receive the second region of the contents to be output and output the received second region.

According to various embodiments of the present disclosure, the communication unit 240 may transmit the mapping table stored in the memory 250 to the second electronic apparatus. In this case, the second electronic apparatus may store the contents and the mapping table in the memory. The communication unit 240 may transmit a reference number of the second region as the content information. The second electronic apparatus may extract the second region associated with the reference number of the second region based on the mapping table. Here, by the order of the electronic apparatus 200 orders to the second electronic apparatus to output the second region, the second electronic apparatus may search for the reference number of the second region in the mapping table, and output the second region of the contents stored in the memory.

In the above, the example in which the electronic apparatus 200 and the second electronic apparatus are connected has been described one-to-one. Hereinafter, an example in which the electronic apparatus 200 and the plurality of second electronic apparatuses are connected one-to-N will be described.

TABLE 3

Mapping Table

| First region | Second region |
| --- | --- |
| Page 101 | Pages 1 to 3 |
| Page 102 | Pages 4 and 5 |
| Page 103 | Page 6 |
| Page 104 | Pages 7 to 10 |

Referring to Table 3, the analysis module 211 may analyze that the contents are an "Ebook," and a study book including 150 pages and including problem pages and answer pages. The analysis module 211 may analyze that the problem pages are pages 1 to 100, and the answer pages are pages 101 to 150 in the study book of the "Ebook." Otherwise, the analysis module 211 may also receive a setting that pages 1 to 100 are the problem pages and pages 101 to 150 are the answer pages from a user. Hereinafter, it will be described that the electronic apparatus 200 analyzes the contents and generates the mapping table, but may generate the mapping table based on the attribute of the contents set by the user.

That is, the user may directly set the mapping table. The generation module 212 may classify page 102 of the answer pages into a first region, and pages 4 and 5 of the problem pages into a second region. Further, the generation module 212 may classify page 103 of the answer page into a first region, and page 6 of the problem page into a second region. In this case, the first region may be contextually associated with the second region. For example, page 101 is associated with pages 1 to 3, page 102 is associated with pages 4 and 5, and page 103 is associated with page 6. The generation module 212 may generate the mapping table by mapping the first region to the electronic apparatus 200 and the second region to the second electronic apparatus.

In this case, the number of second electronic apparatuses may be two or more. Hereinafter, the present disclosure will be described based on a case where the number of electronic apparatuses is plural (for example, N (N is a natural number equal to or larger than 2)). The reason is that for a study book, there is a high possibility that a teacher and one or more students read the study book.

The plurality of second electronic apparatuses may be electronic apparatuses possessed or used by students. The communication unit 240 may receive the type of apparatus from each of the second electronic apparatuses. The type of apparatus may be an attribute of the region of the contents to which the second electronic apparatus belongs, or may be information about the region of the contents which the second electronic apparatus desires to receive. The type of apparatus may be set by a second user of the second electronic apparatus. In this example, the contents are the study book, so that the types of the plurality of second electronic apparatuses may be information about the region to which the problem page belongs. Here, all of the types of the plurality of second electronic apparatuses may be the same. The generation module 212 may generate the mapping table by mapping the second region of the contents to the plurality of second electronic apparatuses based on the attribute of the contents and the type of apparatus. The communication unit 240 may transmit the same content information about the second region to the plurality of second electronic apparatuses. The output unit 220 may output the first region of the contents. For example, the display unit 230 may display the first region of the contents.

TABLE 4

Mapping Table for Music Score

| First region | Second region | Third region | Fourth region |
| --- | --- | --- | --- |
| Conductor | Violin 1 | Violin 2 | Cello |
| 1-10 | 101 | 201 | 301 |
| 11-20 | 102 | 202 | 302 |
| 21-30 | 103 | 203 | 303 |
| 31-40 | 104 | 204 | 304 |

Referring to Table 4, the analysis module 211 may analyze that the contents are a "music score book" including 350 pages, and the contents include a full music score including all of the music scores for each musical instrument, and a music score according to a musical instrument. The generation module 212 may classify the full music score including all of the music scores for the musical instruments into a first region and the music score for each musical instrument into a second region. The first region may be viewed by a conductor, and the second region may be viewed by a musical performer playing the musical instrument. When the number of musical instruments is two or more, the second region may be divided into a second region, a third region, and a fourth region according to the musical instrument.

Referring to Table 4, the generation module 212 may classify "violin 1" that is a first musical instrument into the second region, "violin 2" that is a second musical instrument into the third region, and a "cello" that is a third musical instrument into the fourth region. For example, the first region may be the full music score viewed by the conductor, the second region may be a music score viewed by musical performer 1 playing the violin, the third region may be a music score viewed by musical performer 2 playing the violin, and the fourth region may be a music score viewed by a musical performer playing the cello. In this case, the first region may be temporally or contextually associated with the second region. For example, pages 1 to 10 are associated with pages 101, 201, and 301, pages 11 to 20 are associated with pages 102, 202, and 302, and pages 21 to 30 are associated with pages 103, 203, and 303. The generation module 212 may generate a mapping table by mapping the first region to the electronic apparatus 200 and mapping the second to fourth regions to the corresponding second electronic apparatuses, respectively. Table 4 describes an example in which the music score for each musical instrument is divided based on a page, but the analysis module 211 may analyze the full music score including all of the music scores of the musical instruments and extract a music score from the full music score for each musical instrument.

In this case, the number of second electronic apparatuses may be two or more of the electronic apparatuses, other than the electronic apparatus 200, may be interpreted as the second electronic apparatuses. Hereinafter, the present disclosure will be described based on a case where the number of electronic apparatuses is plural (for example, N (N is a natural number equal to or larger than 2)). The reason is that for a music score, there is a high possibility that a conductor and one or more musical performers view the music score. The plurality of second electronic apparatuses may be electronic apparatuses possessed or used by musical performers.

Here, in order to help understand this disclosure, the plurality of second electronic apparatuses may include a second electronic apparatus, a third electronic apparatus, and a fourth electronic apparatus. For example, it will be described that an electronic apparatus of the musical performer playing violin 1 is the second electronic apparatus, an electronic apparatus of the musical performer playing violin 2 is the third electronic apparatus, and an electronic apparatus of the musical performer playing the cello is the fourth electronic apparatus. In this case, the number of each of the second to fourth electronic apparatuses may be one, or two or more. The communication unit 240 may receive the type of apparatus from each of the second electronic apparatuses. Here, the contents are the music score, the type of apparatus may be information about a musical instrument. That is, the types of the plurality of second electronic apparatuses may be the different.

For example, a second apparatus type of the second electronic apparatus may be "violin 1," a third apparatus type of the third electronic apparatus may be "violin 2," and a fourth apparatus type of the fourth electronic apparatus may be a "cello." The generation module 212 may generate the mapping table by mapping the second to fourth regions of the contents to the second to fourth electronic apparatuses, respectively, based on the attribute of the contents and the apparatus. The communication unit 240 may transmit content information about the second region to the second electronic apparatus, content information about the third region to the third electronic apparatus, and content information about the fourth region to the fourth electronic apparatus.

That is, the communication unit 240 may transmit content information about the different regions to the second to fourth electronic apparatuses, respectively. The content information about each region may be the contents itself or a reference number (for example, page number) of the region. The output unit 220 may output the first region of the contents. For example, the display unit 230 may display the first region of the contents. Referring to Table 4, the communication unit 240 may transmit content information about page 101 to the second electronic apparatus, content information about page 201 to the third electronic apparatus, and content information about page 301 to the fourth electronic apparatus. The display unit 230 may display the music score of pages 1 to 10. For example, the display unit 230 may display the music score of pages 1 to 10 together with the transmission of the content information at the same time or with a time difference.

According to various embodiments of the present disclosure, the confirmation module 214 may analyze a sound received from the microphone of the output unit 220 and confirm measures of the full music score related to the sound. When an input of turning the music score by using a hand of the user or other means is received, the controller 210 may process the received input as an input for moving to a following page. The input may be an input of bending, rotating, or quickly turning a page of the music score, and the like. Otherwise, even though the page of the music score is not turned by the hand of the user or other means, the controller 210 may analyze a sound performed through the microphone, and recognize a main melody. In this case, when the controller 210 recognizes that a page of one music score (for example, a music score of a violin performing the main melody) is turned by confirming the measures of the full music score related to the sound through the analyzed sound, the controller 210 may transmit a command to display a page corresponding to the corresponding page in another music score. To this end, the communication unit 240 may transmit information about the measure to each of the second electronic apparatuses. The second apparatuses may also display the music score related to the measure by using the information related to the measure.

For example, referring to the mapping table of Table 4, the controller 210 may analyze the received sound and confirm the measures of the music score related to the sound as "11 to 20." The controller 210 considers "11 to 20," which are the confirmed measures of the music score, as the first region, and identify the second to fourth regions related to the first region by referring to the mapping table of Table 4. The communication unit 240 may transmit content information about page 102 to the second electronic apparatus, content information about page 202 to the third electronic apparatus, and content information about page 302 to the fourth electronic apparatus. The display unit 230 may display the music score of pages 11 to 20.

According to various embodiments of the present disclosure, the display unit 230 may display the first region of the contents. In this case, when the second electronic apparatus is located within a predetermined distance, the communication unit 240 may transmit the content information about the second region, which is not displayed on the display unit 230, to the second electronic apparatus. The second electronic apparatus may display the second region of the contents. The second region may be a region, which is not displayed on the display unit 230 while the first region is displayed on the display unit 230. For example, the second region may be a region displayed on the display unit 230 only when a scroll bar is moved. The communication unit 240 may transmit the content information about the second region, which is not displayed through the display unit 230, to the second electronic apparatus, so that the second electronic apparatus may display the second region of the content which is not displayed on the display unit 230. The input unit 260 may receive an input from a user.

The input may be a command of moving the scroll bar in up, down, left, and right directions. Otherwise, the input may be an input of bending, rotating, or fast turning the music score, and the like. The display unit 230 may display the third region of the contents according to the input of the user. When the third region of the contents is displayed on the display unit 230, the communication unit 240 may transmit the content information about the fourth region of the contents, which is not displayed on the display unit 230, to the second electronic apparatus. In this case, the second electronic apparatus may display the fourth region of the contents. The second electronic apparatus may determine a region to be displayed which is linked with the region of the contents displayed on the display unit 230 of the electronic apparatus 200.

The memory 250 may store the contents and the mapping table. The memory 250 may store software required for the operation of the electronic apparatus 200 and various data received or generated by the use of the electronic apparatus 200. The memory 250 may include a predetermined form of a digital storage readable or recordable by the controller 210. In order to perform functions, one or more programs may be stored in the memory 250. The memory 250 may include a disk, a Random Access Memory (RAM), a Read Only Memory (ROM), and a flash memory as a secondary memory unit of the controller 210. The memory 250 stores data (for example, contact information) generated by the electronic apparatus 200 and data (for example, a message and a video file) received from the outside through the communication unit 240. The memory 250 includes size information about an image (for example, a keypad, a video, and a message) and display area information about the image.

The display unit 230 (for example, the display 150 of FIG. 1) displays an image on a screen under the control of the controller 210. That is, when the controller 210 processes (for example, decodes) data into an image to be displayed on the screen and stores the processed image in a buffer, the display unit 230 converts the image stored in the buffer into an analog and displays the converted analog signal on the screen. The display panel 230 may be formed of a Liquid Crystal Display (LCD), OLED (Organic Light Emitted Diode), an Active Matrix Organic Light Emitted Diode (AMOLED), or a flexible display.

In addition, the electronic apparatus 200 of FIG. 2 may further include the constituent elements included in the electronic apparatus 101 of FIG. 1.

An electronic apparatus according to various embodiments of the present disclosure may include: a controller for analyzing an attribute of contents and generating a mapping table by mapping a first region of the contents and a second region of the contents associated with the first region; a communication unit for transmitting contents information about the second region related to the mapping table to a second electronic apparatus; and an output unit for outputting the contents.

The controller may include an analysis module for analyzing at least one of the type of data included in the contents, a page number of the contents, a layer of the contents, and the number of measures of the contents as the attribute of the contents.

The control module 170 may obtain the attribute of the contents from the contents, analyze the contents and generate the attribute of the contents, or receive a setting of the attribute of the contents from a user.

The electronic apparatus may further include an input unit for receiving a selection of the contents, and the controller may include a detection module for detecting whether the electronic apparatus is connected with the second electronic apparatus, and a generation module for generating the mapping table by mapping the first region of the contents or the second region of the contents to the connected second electronic apparatus based on the attribute of the selected contents.

When the number of connected second electronic apparatuses is two or more, the communication unit may receive the type of apparatus from each of the second electronic apparatuses. The generation module may generate the mapping table by mapping the first region of the contents or the second region of the contents to each second electronic apparatus based on the attribute of the contents and the type of each apparatus.

When the contents are related to a music score, the controller may include an analysis module for analyzing a musical instrument included in the music score. The communication unit 240 may receive the type of apparatus from each of the second electronic apparatuses. The controller may include a generation module for generating the mapping table by mapping the analyzed musical instrument of the music score to each of the second electronic apparatuses based on the type of each apparatus.

The controller may analyze a sound and confirm a measure of a music score related to the sound, and the communication unit may transmit content information related to the measure to each second electronic apparatus. The electronic apparatus may further include a display unit for displaying the music score related to the measure.

The communication unit may transmit the mapping table to the second apparatus.

The display unit may display the first region of the contents, and when the second electronic apparatus is located within a predetermined distance, the communication unit may transmit content information about the second region, which is not displayed on the display unit, to the second electronic apparatus.

The controller may detect an input of a user, the display unit may display a third region of the contents in response to the input of the user, and the communication unit may transmit content information about a fourth region, which is not displayed on the display unit, to the second electronic apparatus.

Figure 3:
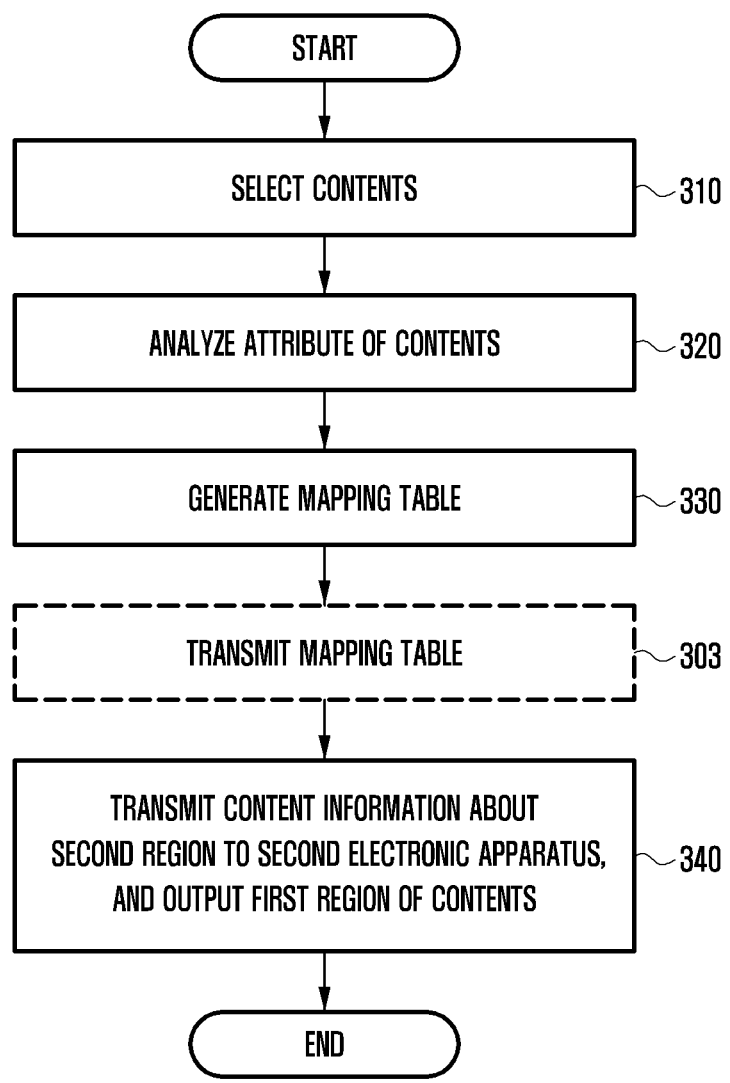
FIG. 3 illustrates a method of providing contents according to various embodiments of the present disclosure.

FIG. 3 illustrates a method of providing contents according to various embodiments of the present disclosure. The method of providing contents of the present disclosure may be performed by an electronic apparatus (for example, the electronic apparatus 101 of FIG. 1 or the electronic apparatus 200 of FIG. 2). The electronic apparatus described with reference to FIG. 3 may be interpreted as a first electronic apparatus, and corresponds to a master terminal.

Referring to FIG. 3, in operation 310, a controller (for example, the control module 170 of FIG. 1 or the controller 210 of FIG. 2) of the electronic apparatus may receive contents from a user, for example, a selection of contents selected by the user. The contents may be configured by at least one of a text, an image, an audio, a video, and a voice. The contents may be contents stored in a memory (for example, the memory 130 of FIG. 1 or the memory 250 of FIG. 2) or downloaded through streaming services or downloaded services.

In operation 320, the controller may analyze an attribute of the selected contents. The attribute of the contents may be at least one of the type of data included in the contents, a page number of the contents, a layer of the contents, and the number of measures of the contents. The controller may obtain the attribute of the contents from the contents, analyze the contents and generate the attribute of the contents, or receive a setting of the attribute of the contents from a user. For example, the type of data may be at least one of a text, an image, a video, a symbol, an icon, and a sign. The page number may be at least one of the number of pages, an even number, and an odd number. In the layer of the contents, data is divided for each layer, and the layer may be divided according to the type of data.

For example, the image included in the contents may be divided into a first layer and text included in the contents may be divided into a second layer. The number of measures of the contents may be a unit of outputting the contents. For example, when the contents are a music score, the controller may analyze the number of total measures included in the music score and the number of measures able to be output at a time as the attribute. A communication unit (for example, the communication interface 160 of FIG. 1 or the communication unit 240 of FIG. 2) of the electronic apparatus may connect the electronic apparatus to a second electronic apparatus (for example, the external electronic apparatus 104 of FIG. 1) any time while performing operations 310 and 320. A connection between the electronic apparatus and the second electronic apparatus may mean a state where the electronic apparatus and the second electronic apparatus may transceive data with each other. For example, the communication unit may pair the electronic apparatus with the second electronic apparatus, or connect the electronic apparatus with the second electronic apparatus by a specific communication method.

In operation 330, the controller may generate a mapping table for mapping a first region of the contents with a second region of the contents associated with the first region based on the attribute of the contents. In the mapping table, a plurality of regions included in the contents may be classified for each attribute of the contents, and the respective classified regions are mapped to electronic apparatuses which are to output the respective classified regions. For example, the mapping table may also include information about the contents itself, and a reference number for identifying the region included in the contents. The controller may generate the mapping table by mapping the first region of the contents to the electronic apparatus (the electronic apparatus itself) and mapping the second region of the contents to the second electronic apparatus.

For example, the controller may generate the mapping table by classifying a region including an image of contents into a first region and a region including text of the contents as a second region, and mapping the first region of the contents to the electronic apparatus (the electronic apparatus itself) and mapping the second region of the contents to the second electronic apparatus. Otherwise, the controller may generate a mapping table by classifying a region including odd-numbered pages of contents into a first region and a region including even-numbered pages of contents into a second region. Otherwise, the controller may generate a mapping table by classifying a first layer of contents into a first region and a second layer of contents into a second region. Otherwise, the controller may generate a mapping table by classifying a full music score of contents into a first region and a music score for each musical instrument into a second region. When the contents are a full music score, the second region may be classified into a third region and a fourth region according to a musical instrument.

The controller may store the generated mapping table in the memory. In operation 303, when the mapping table is completely generated, the communication unit may transmit the mapping table to the second electronic apparatus. Otherwise, the communication unit may not transmit the mapping table to the second apparatus.

In operation 340, the communication unit may transmit content information about the second region related to the mapping table to the second electronic apparatus. For example, the communication unit may transmit the content information about the second region to the second electronic apparatus by any one of Digital Living Network Alliance (DLNA), Allshare, and miracast of WiFi Direct. An output unit (the input/output interface 140 of FIG. 1 or the output unit 220 of FIG. 2) of the electronic apparatus may output the first region of the contents. For example, the output unit may output a sound corresponding to the first region of the contents through a speaker, or display the first region of the contents on the display unit. The output may mean reproducing an audio and/or a video.

The communication unit may be connected one-to-one (1:1) with the second electronic apparatus, and may be connected one-to-N with a plurality of second electronic apparatuses. When the number of second electronic apparatuses is two or more, the communication unit may receive the type of apparatus from each of the plurality of second electronic apparatuses. The type of apparatus may be an attribute of the region of the contents to which the second electronic apparatus belongs, or be information about the region of the contents which the second electronic apparatus desires to receive. The type of apparatus may be set by a second user of the second electronic apparatus. All of the types of the plurality of second electronic apparatuses may be the same or different from each other. For example, when the types of the two second electronic apparatuses are the same, the communication unit may transmit page 2 of the contents to the two second electronic apparatuses, and the output unit may reproduce page 1 of the contents. Otherwise, when the types of the two second electronic apparatuses are different from each other, the communication unit may transmit page 2 of the contents to a second electronic apparatus and page 3 of the contents to a third electronic apparatus, and the output unit may reproduce page 1 of the contents.

According to various embodiments of the present disclosure, the controller may search for the second region matched with the first region in the mapping table stored in the memory, and the communication unit may transmit content information about the searched second region to the second electronic apparatus while the output unit outputs the first region. The second electronic apparatus may output the received second region. That is, the communication unit 240 may transmit the contents itself corresponding to the second region as the content information. The second electronic apparatus may receive the second region of the contents and output the second region. In this case, the second electronic apparatus may not store the contents in the memory, but receive the second region of the contents to be output and output the received second region.

According to various embodiments of the present disclosure, the communication unit may transmit the mapping table stored in the memory to the second electronic apparatus. In this case, the second electronic apparatus may store the contents and the mapping table in the memory. The communication unit may transmit the content information about the second region as the content information. The second electronic apparatus may extract the second region based on the contents and the mapping table stored in the memory. The second electronic apparatus may output the second region of the contents stored in the memory by searching for the reference number of the second region in the mapping table.

According to various embodiments of the present disclosure, the controller may analyze a sound received from a microphone of the output unit and confirm measures of the full music score related to the sound. When an input of turning the music score by using a hand of the user or other means is received, the controller may process the received input as an input for moving to a following page. Otherwise, even though the music score is not turned through the hand of the user or other means, the controller may analyze a sound performed through the microphone, and recognize a main melody.

In this case, when the controller recognizes that a page of one music score (for example, a music score of a violin performing the main melody) is turned by confirming the measures of the full music score related to the sound through the analyzed sound, the controller may transmit a command to display a page related to the corresponding page in another music score. To this end, the communication unit may transmit information about the measure to each of the second electronic apparatuses. The second apparatus may also display the music score related to the measure by using the information related to the measure.

According to various embodiments of the present disclosure, the display unit may display the first region of the contents. In this case, when the second electronic apparatus is located within a predetermined distance, the communication unit may transmit the content information about the second region, which is not displayed on the display unit, to the second electronic apparatus. The second electronic apparatus may display the second region of the contents. The second region may be a region, which is not displayed on the display unit while the first region is displayed on the display unit.

For example, the second region may be a region displayed on the display unit 230 only when a scroll bar is moved. The input may be a command of moving the scroll bar in up, down, left, and right directions. The display unit may display the third region of the contents according to the input of the user. When the third region of the contents is displayed on the display unit, the communication unit may transmit content information about the fourth region of the contents, which is not displayed on the display unit, to the second electronic apparatus. In this case, the second electronic apparatus may display the fourth region of the contents. The second electronic apparatus may determine a region to be displayed while being linked with the region of the contents displayed on the display unit of the electronic apparatus 200.

Figure 4A:
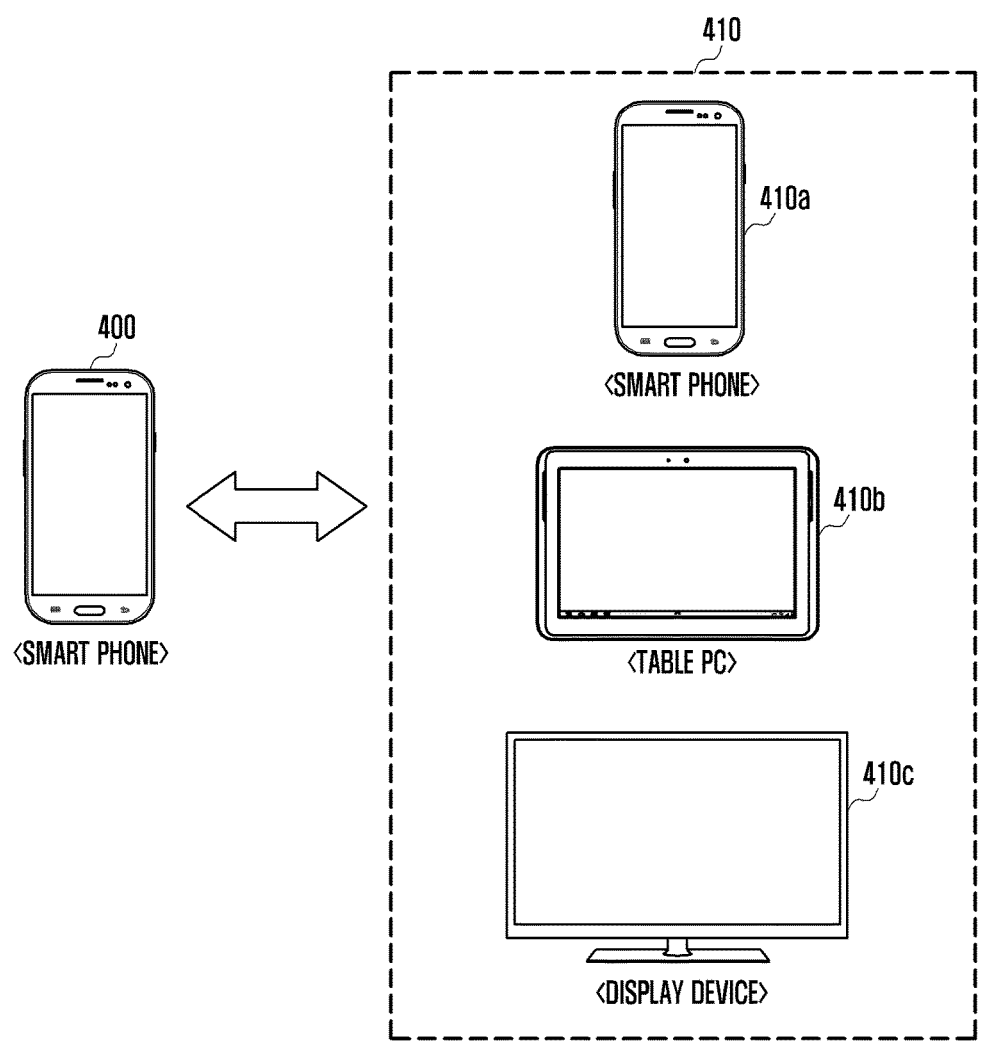
FIGS. 4A to 4C are diagrams illustrating a content providing system according to various embodiments of the present disclosure.

Referring to FIG. 4A, a content providing system may be configured of a first electronic apparatus (for example, the electronic apparatus 101 of FIG. 1 or the electronic apparatus 200 of FIG. 2) denoted by reference numeral 400 and a second electronic apparatus denoted by reference numeral 410. The first electronic apparatus 400 may be any one of a portable terminal, such as a smart phone, a computer, such as a tablet PC, and a display device, such as a TV. Further, the second electronic apparatus 410 may be any one of a portable terminal 410a, such as a smart phone, a computer 410b, such as a tablet PC, and a display device 410c, such as a TV. That is, the types (a portable terminal, a tablet PC, and a TV) of the first electronic apparatus and the second electronic apparatus may be differently applied according to contents and a user.

Figure 4B:
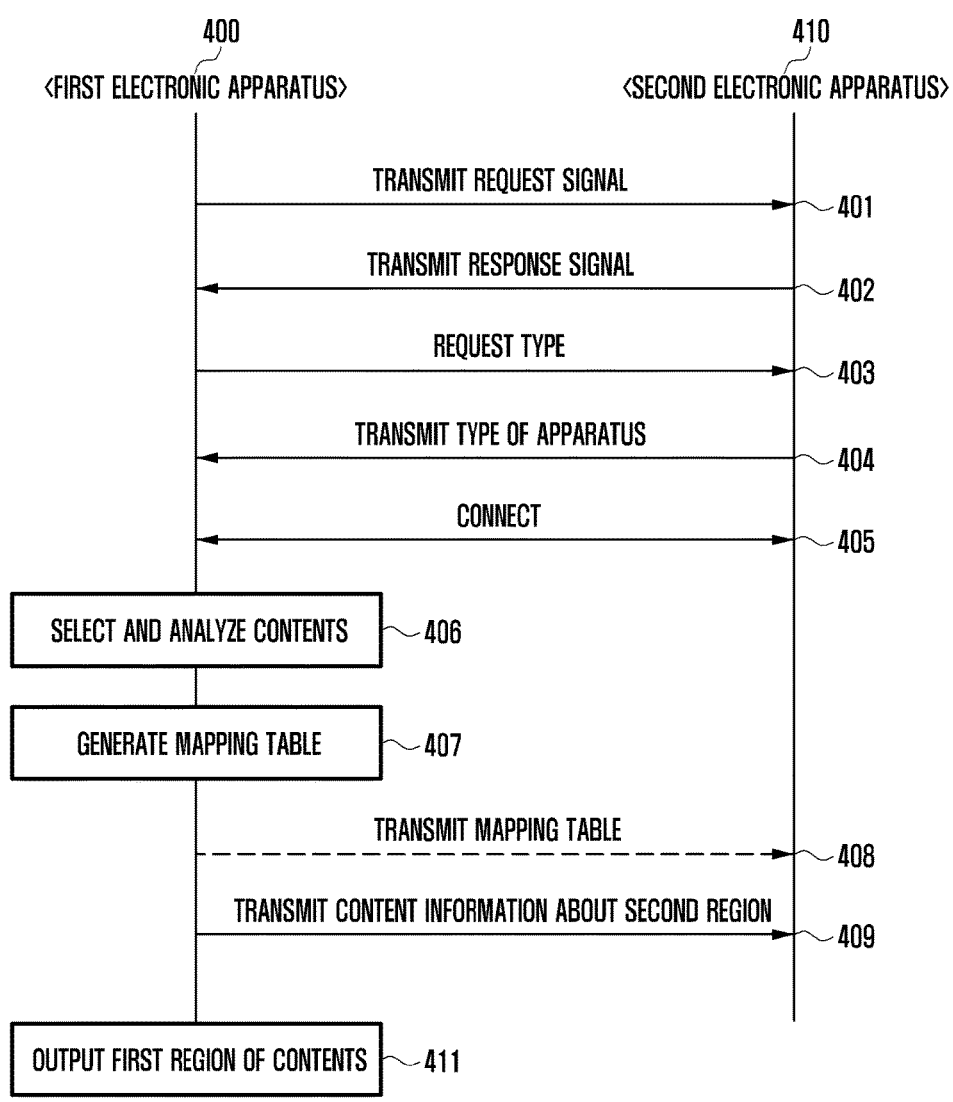
Figure 4C:
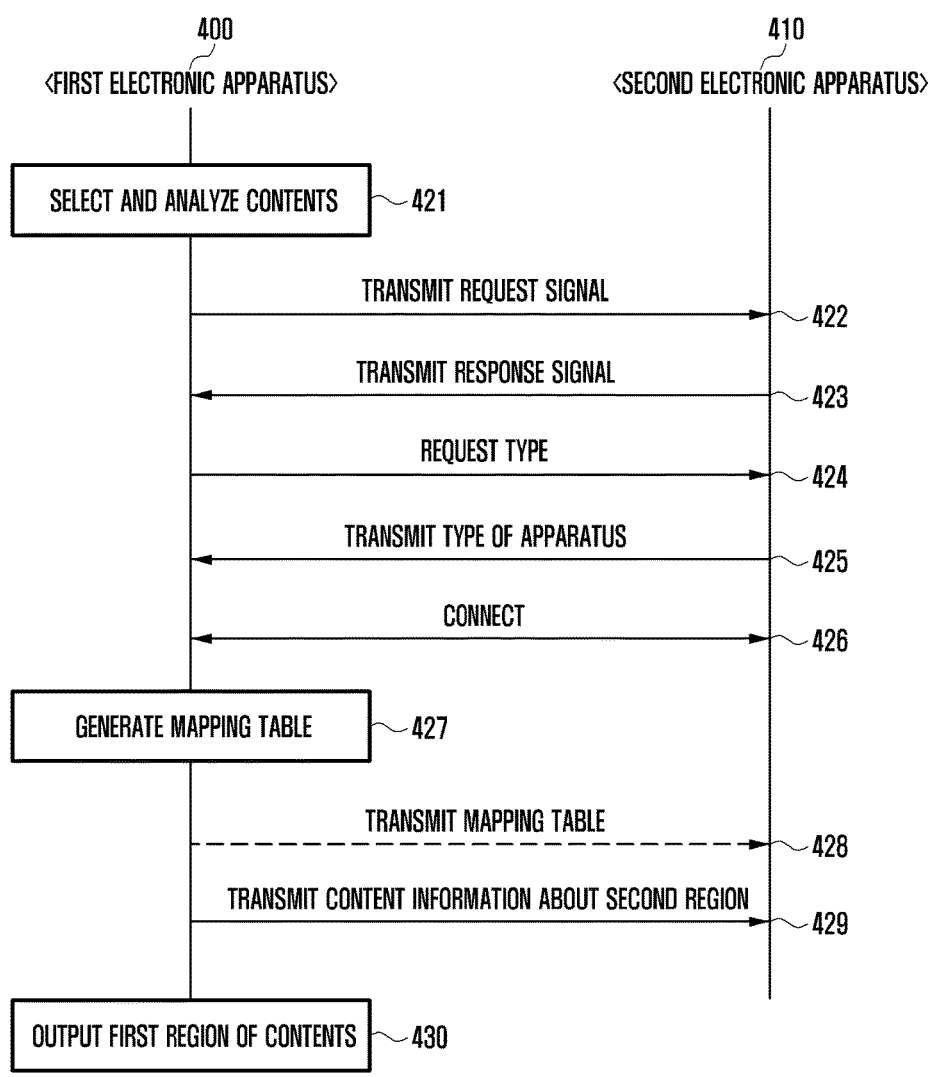

FIGS. 4A to 4C are diagrams illustrating a content providing system according to various embodiments of the present disclosure.

Referring to FIG. 4A, a content providing system may be configured of a first electronic apparatus (for example, the electronic apparatus 101 of FIG. 1 or the electronic apparatus 200 of FIG. 2) denoted by reference numeral 400 and a second electronic apparatus denoted by reference numeral 410. The first electronic apparatus 400 may be any one of a portable terminal 410a, such as a smart phone, a computer 410b, such as a tablet PC, and a display device 410c, such as a TV. Further, the second electronic apparatus 410 may be any one of a portable terminal, such as a smart phone, a computer, such as a tablet PC, and a display device, such as a TV. That is, the types (a portable terminal, a tablet PC, and a TV) of the first electronic apparatus and the second electronic apparatus may be differently applied according to contents and a user.

Referring to FIG. 4B, in operation 401, the first electronic apparatus 400 may transmit a request signal to the second electronic apparatus 410. The first electronic apparatus 400 may transmit the request signal to the second electronic apparatus by any one of DLNA, Allshare, and miracast of WiFi Direct. The request signal may be transmitted to a predetermined second electronic apparatus located within a pre-selected region. Otherwise, the request signal is for requesting a connection, and may include information on an identification number, a name, and a type of the first electronic apparatus 400. In operation 402, the second electronic apparatus 410 may transmit a response signal in response to the request signal. The response signal may include information regarding an identification number, a name, and the like of the first electronic apparatus 400.

In operation 403, the first electronic apparatus 400 may receive the response signal and request the type of apparatus. The type of apparatus is for recognizing information about a region to be transmitted to the second electronic apparatus 410. For example, the type of apparatus may be an attribute of the region of the contents to which the second electronic apparatus 410 belongs, or information about a region of the contents which the second electronic apparatus 410 desires to receive. The type of apparatus may be set by a second user of the second electronic apparatus 410. In operation 404, the second electronic apparatus 410 may transmit the type of apparatus to the first electronic apparatus 400. When the type of apparatus is received, a connection between the first electronic apparatus 400 and the second electronic apparatus 410 may be completed in operation 405.

In operation 406, the first electronic apparatus 400 may receive a selection of contents to be output from a user, and analyze the selected contents. The contents may be multimedia contents including at least one of text, an image, a video, a document, and music. The first electronic apparatus 400 may analyze at least one of the type of data included in the contents, a page number of the contents, a layer of the contents, and the number of measures of the contents as an attribute of the selected contents.

In operation 407, the first electronic apparatus 400 may generate a mapping table for mapping a first region of the contents with a second region of the contents associated with the first region based on the attribute of the contents. In the mapping table, a plurality of regions included in the contents may be classified for each attribute of the contents, and the respective classified regions are mapped to electronic apparatuses which are to output the respective classified regions. The first electronic apparatus 400 may store the mapping table in a memory.

In operation 408, the first electronic apparatus 400 may transmit the mapping table to the second electronic apparatus 410. Otherwise, the first electronic apparatus 400 may not transmit the mapping table to the second electronic apparatus 410.

In operations 409 and 411, the first electronic apparatus 400 may transmit content information about the second region related to the mapping table to the second electronic apparatus 410, and output the first region of the contents. The first electronic apparatus 400 may simultaneously perform operation 409 and operation 411, first perform operation 409 and then perform operation 411, or first perform operation 411 and then perform operation 409.

Here, the first electronic apparatus 400 and the second electronic apparatus 410 may simultaneously output the first region and the second region, respectively. Otherwise, the first electronic apparatus 400 and the second electronic apparatus 410 may output the first region and the second region with a time difference according to contents.

Referring to FIG. 4C, in operation 421, the first electronic apparatus 400 may receive a selection of contents to be output from a user, and analyze the analyzed contents. The contents may be multimedia contents including at least one of text, an image, a video, a document, and music. The first electronic apparatus 400 may analyze at least one of the type of data included in the contents, a page number of the contents, a layer of the contents, and the number of measures of the contents as an attribute of the selected contents.

In operation 422, the first electronic apparatus 400 may transmit a request signal to the second electronic apparatus 410. The request signal may be transmitted to a predetermined second electronic apparatus located within a preselected region. Otherwise, the request signal is for requesting a connection, and may include information on an identification number, a name, and a type of the first electronic apparatus 400. In operation 423, the second electronic apparatus 410 may transmit a response signal in response to the request signal. The response signal may include information on an identification number, a name, and the like of the second electronic apparatus 410. In operation 424, the first electronic apparatus 400 may receive the response signal and request the type of apparatus. The type of apparatus is for recognizing information about a region to be transmitted to the second electronic apparatus 410.

For example, the apparatus type may be an attribute of the region of the contents to which the second electronic apparatus 410 belongs, or information about a region of the contents which the second electronic apparatus 410 desires to receive. The type of apparatus may be set by a second user of the second electronic apparatus 401 operation 425, the second electronic apparatus 410 may transmit the type of apparatus to the first electronic apparatus 400. When the type of apparatus is received, a connection between the first electronic apparatus 400 and the second electronic apparatus 410 may be completed in operation 426.

In operation 427, the first electronic apparatus 400 may generate a mapping table for mapping a first region of the contents with a second region of the contents associated with the first region based on the attribute of the contents. In the mapping table, a plurality of regions included in the contents may be classified for each attribute of the contents, and the respective classified regions are mapped to electronic apparatuses which are to output the respective classified regions. The first electronic apparatus 400 may store the mapping table in a memory.

In operation 428, the first electronic apparatus 400 may transmit the mapping table to the second electronic apparatus 410. Otherwise, the first electronic apparatus 400 may not transmit the mapping table to the second electronic apparatus 410.

In operations 429 and 430, the first electronic apparatus 400 may transmit content information about the second region related to the mapping table to the second electronic apparatus, and output the first region of the contents. The first electronic apparatus 400 may simultaneously perform operation 429 and operation 430, first perform operation 429 and then perform operation 430, or first perform operation 430 and then perform operation 429.

Here, the first electronic apparatus 400 and the second electronic apparatus 410 may simultaneously output the first region and the second region, respectively. Otherwise, the first electronic apparatus 400 and the second electronic apparatus 410 may output the first region and the second region with a time difference according to contents.

Figure 5A:
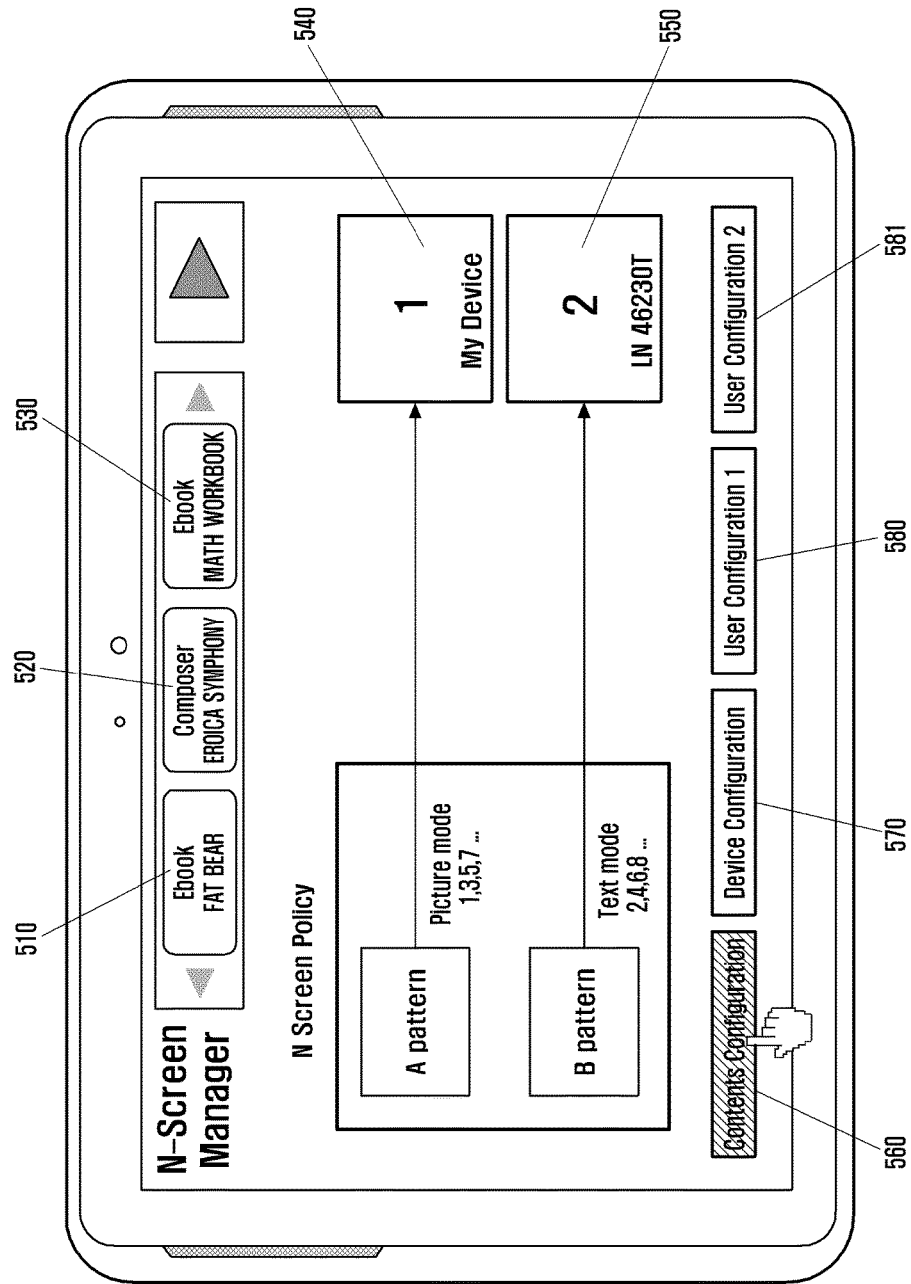
FIG. 5A illustrates an example of a screen of providing contents while being linked with another electronic apparatus according to various embodiments of the present disclosure.

FIG. 5A illustrates one example of a screen of providing contents while being linked with another electronic device according to various embodiments of the present disclosure.

Figure 5B:
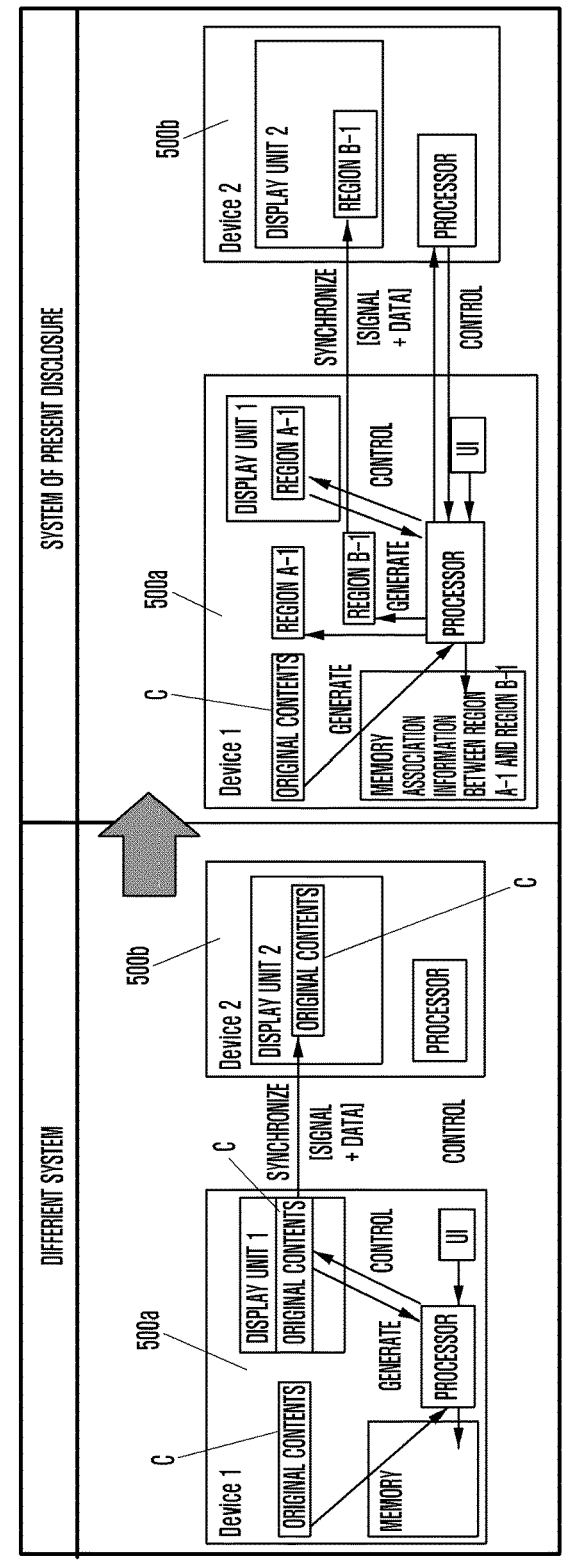
FIG. 5B illustrates a difference between a content providing system according to various embodiments of the present disclosure and a different content providing system.

FIG. 5A illustrates a screen for outputting contents which are linked with a second electronic apparatus by a first electronic apparatus. In FIG. 5A, reference numeral 540 refers to the first electronic apparatus, and reference numeral 550 refers to the second electronic apparatus. When the first electronic apparatus 540 displays the second electronic apparatus 550, the second electronic apparatus 550 may be displayed with a name of "LN 46230T." The name of the second electronic apparatus 550 may be set by a second user of the second electronic apparatus 550. In FIGS. 5A and 5B, a first user may mean a user using or possessing the first electronic apparatus 540, and the second user may mean a user using or possessing the second electronic apparatus 550. This is for helping understand the disclosure, and does not limit the present disclosure.

The first electronic apparatus 540 may display a list of contents able to be output through a service of "N-Screen Manager." The list of the contents may include an Ebook, "Fat Bear" denoted by reference numeral 510, a Composer, "Eroica Symphony" denoted by reference numeral 520, and an Ebook, "Math Workbook" denoted by reference numeral 530. When the first user clicks a scroll bar at either side of the list of the contents, the first electronic apparatus 540 may display other contents which are not displayed on a current screen. When the first user selects one item in the list of the contents, the first electronic apparatus 540 may fetch a content policy (for example, N Screen Policy), which is to be reproduced in the first electronic apparatus 540 and the second electronic apparatus 550 from a "Contents Configuration" file 560 and display a first region based on the "Contents Configuration," and the first user may connect the second electronic apparatus 550 and the corresponding policy by a drag and drop scheme.

The N Screen Policy is a briefly displayed mapping table to output the contents, and represents that, for example, the first electronic apparatus 540 outputs the contents with pattern A and the second electronic apparatus 550 outputs the contents with pattern B. As illustrated in FIG. 5A, pattern A is a pattern for displaying an image in a "Picture Mode," and the image is included in odd-numbered pages, such as pages, 1, 3, 5, and 7, so that the first electronic apparatus 540 outputs the odd-numbered pages of a book as a first region. Pattern B is a pattern for displaying text in a "Text Mode," and the text is included in even-numbered pages, such as pages 2, 4, 6, and 8, so that the second electronic apparatus 550 outputs the even-numbered pages of the book as a second region. An attribute of the contents is required so as to synchronize the first region and the second region, and the attribute of the contents may be obtained from the contents, generated by analyzing the contents by the first electronic apparatus 540, or set by the first user.

When the first user selects the "Contents Configuration" 560, the first electronic apparatus 540 may obtain the attribute of the contents from the contents. When the first user selects a "Device Configuration" 570, the first electronic apparatus 540 may analyze the contents and generate the attribute of the contents. When the first user selects a "User Configuration 1" 580 or a "User Configuration 2" 581, the first electronic apparatus 540 may receive a setting of the attribute of the contents from the first user. The attribute of the contents of the "User Configuration 1" 580 may be different from the attribute of the contents of the "User Configuration 2" 581.

FIG. 5B illustrates a difference between a content providing system according to various embodiments of the present disclosure and a different content providing system.

FIG. 5B illustrates screens compared for helping easy understanding of a difference between an "N-Screen Manager" (left side) of the different system from and an "N-Screen Manager" (right side) of the present disclosure. According to the different system (left box), when a device 1 500*a*. (for example, the first electronic apparatus) displays original contents C on a display unit 1, a device 2 500*b* (for example, the second electronic apparatus) identically displays the original contents C on a display unit 2. However, according to the present disclosure (right box), when a device 1 500*a* displays region A-1 of original contents C on a display unit 1, a device 2 500*b* (for example, the second electronic apparatus) displays region B-1 associated with the region A-1 on a display unit 2. According to the present disclosure, when the device 1 and the device 2 display the same original contents, the device 1 displays the region A-1 of the original contents C and the device 2 displays the region B-1 of the original contents C, so that the device 1 and the device 2 display the different regions.

Figure 5C:
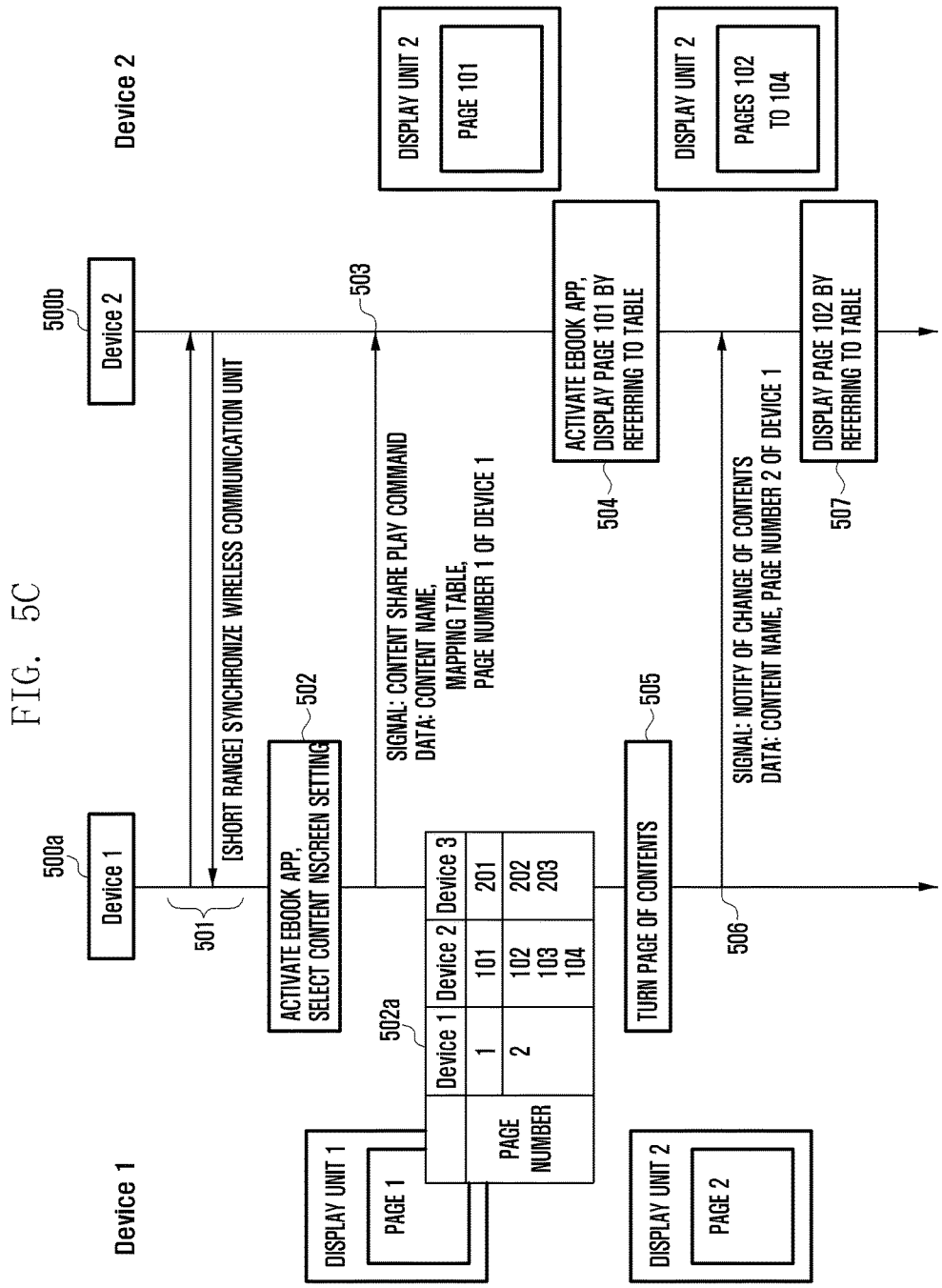
FIG. 5C illustrates a method of providing contents between two electronic apparatuses according to various embodiments of the present disclosure.

FIG. 5C illustrates a method of providing contents between two electronic devices according to various embodiments of the present disclosure.

Referring to FIG. 5C, in operation 501, a device 1 500*a* (for example, a first electronic apparatus) a device 2 (for example, a second electronic apparatus) are connected with each other. The device 1 and the device 2 are in a state of transceiving data with each other. In operation 502, the device 1 may activate an Ebook application according to a selection of a user, and receive a selection that one content within the Ebook application is set for the N-screen. That is, the device 1 may generate a mapping table 502*a* for mapping a first region of the selected contents with a second region of the contents associated with the first region. According to the mapping table 502*a*, when the first region (page 1 and page 2) of the contents is displayed on a display unit 1 of the device 1, the second region (page 101 and pages 102 to 104) of the contents is displayed on a display unit 2. In operation 503, the device 1 may transmit a content share play command to the device 2, and transmit a name of contents, the mapping table 502*a*, and a page number (page 1) of the device 1. In this case, the device 1 may display page 1 on the display unit 1.

In operation 504, the device 2 may activate the Ebook application according to the content share play command, and display page 101 on the display unit 2 by referring to the mapping table 502*a*.

In operation 505, the device 1 may turn over a page of the contents according to an input of a user. In operation 506, the device 1 may notify the device 2 of a change in the contents, and transmit a name of contents and a page number (page 2) of the device to the device 2. In this case, the device 1 may display page 2 on the display unit 1.

In operation 507, the device 2 may display pages 102 to 104 by referring to the mapping table 502*a*.

Figure 6A:
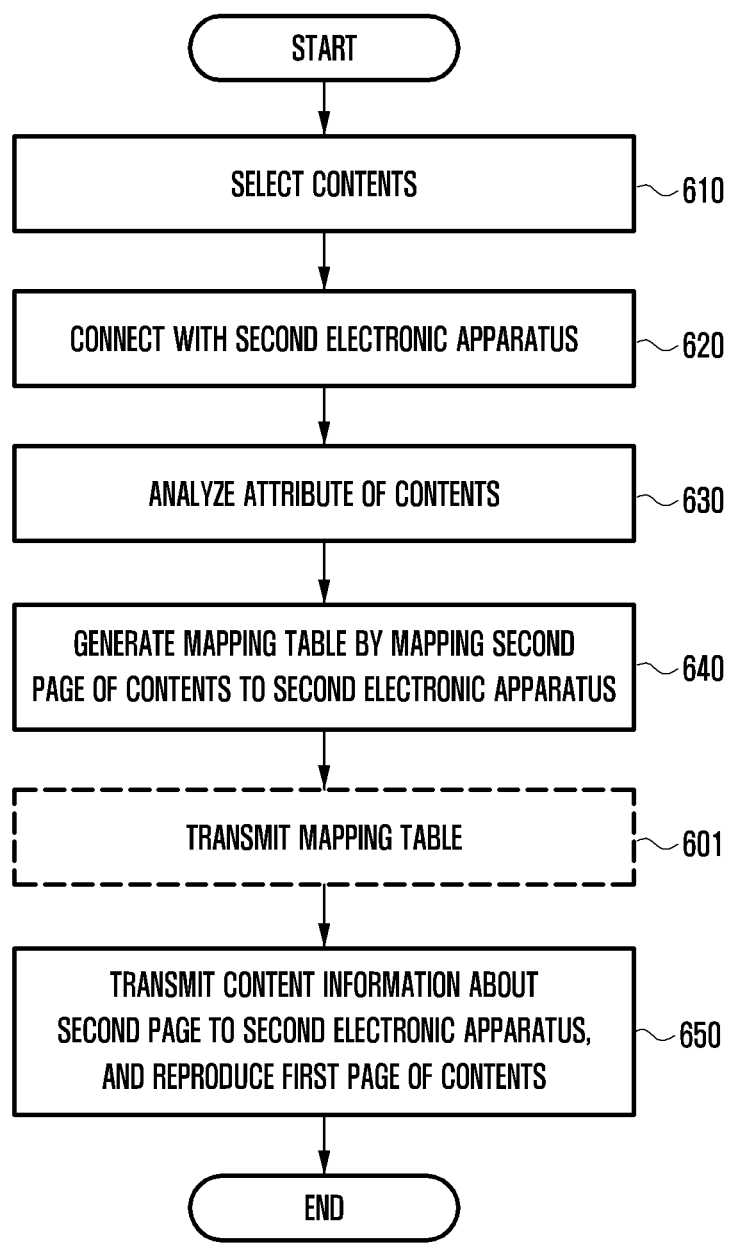
FIGS. 6A and 6B illustrate a process of reproducing contents by mapping the contents for each page of the contents according to various embodiments of the present disclosure.
Figure 6B:
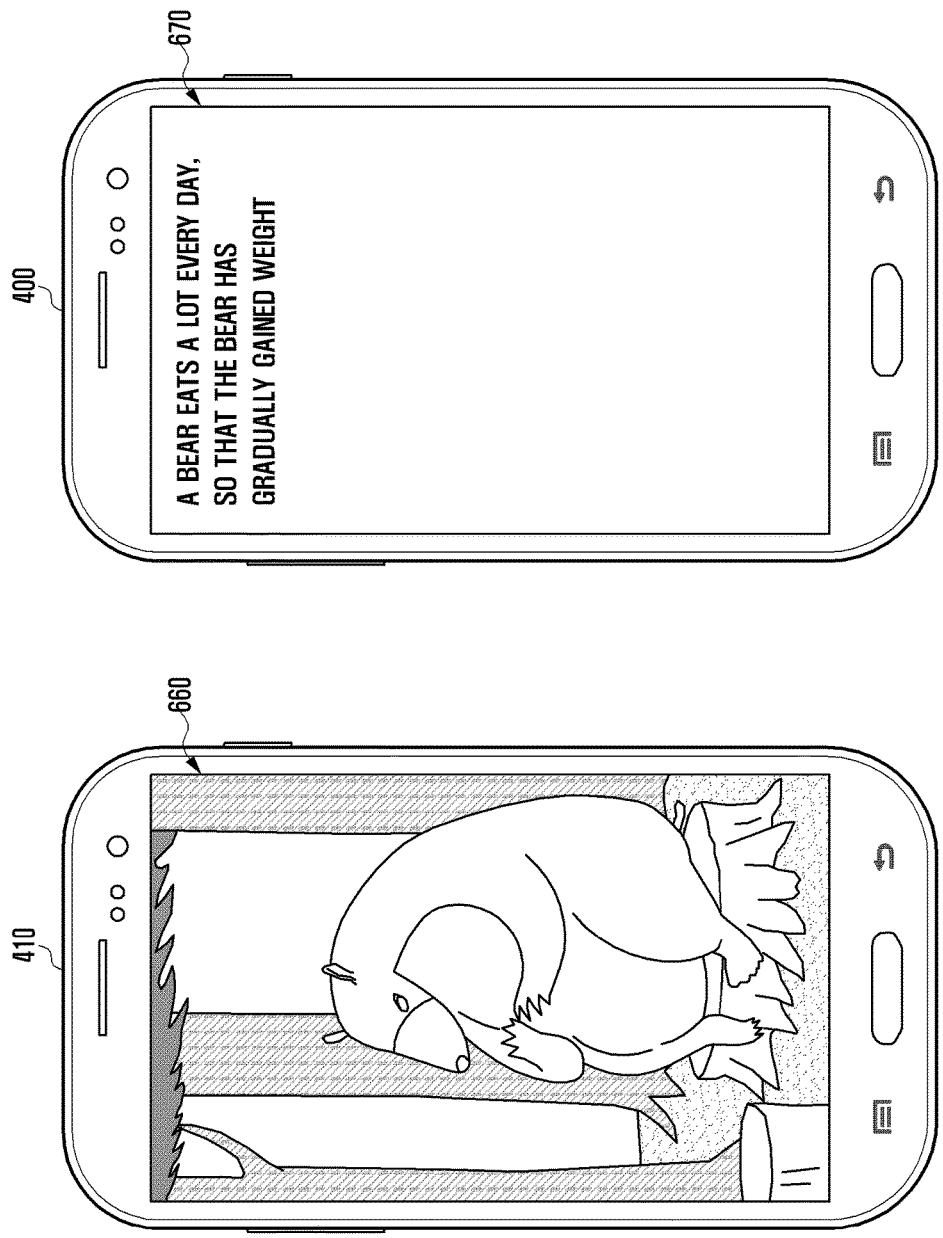

FIGS. 6A and 6B are diagrams illustrating an process of reproducing contents by mapping the contents for each page of the contents according to various embodiments of the present disclosure.

FIG. 6B is an embodiment of contents for children and babies utilizable in a kindergarten and the like. FIG. 6B is an example in which an image of a bear denoted by reference numeral 660 is an image of a second electronic apparatus 410, and an image of text (a bear eats a lot every day, so that the bear has gradually gained weight) denoted by reference numeral 670 is an image of a first electronic apparatus. The second electronic apparatus 410 is viewed by a child who is a second user, and the first electronic apparatus 400 is viewed by an adult who is a first user. FIG. 6B is an example in which the present disclosure is utilized for displaying different contents to the child and the adult.

Hereinafter, a method of displaying an image illustrated in FIG. 6B will be described with reference to FIG. 6A.

Referring to FIG. 6A, in operation 610, the first electronic apparatus 400 may receive a selection of contents corresponding to "Ebook, Fat Bear" 510 of FIG. 5A. In operation 620, the first electronic apparatus 400 may be connected with the second electronic apparatus 410. The connection method is performed in a similar manner to the method illustrated in FIG. 4C. In operation 630, the first electronic apparatus 400 may analyze an attribute of the selected contents. In a general fairy tale book, a picture is shown on one page and text is shown on another page, and the first electronic apparatus 400 may display an image 670 which is generally text, and the second electronic apparatus 410 may display an image 660 which is generally a picture.

In operation 640, the first electronic apparatus 400 may generate a mapping table by mapping a first page of the contents to the first electronic apparatus itself, and a second page of the contents to the second electronic apparatus. For example, the first electronic apparatus may generate a mapping table by mapping odd-numbered pages to the first electronic apparatus in an order of pages 1, 3, 5, and 7, and mapping even-numbered pages, such as pages 2, 4, 6, and 8, to the second electronic apparatus.

In operation 601, the first electronic apparatus 400 may transmit the mapping table to the second electronic apparatus 410. Otherwise, the first electronic apparatus 400 may not transmit the mapping table.

In operation 650, the first electronic apparatus 400 may transmit content information about the second page to the second electronic apparatus 410, and reproduce the first page of the contents.

According to various embodiments of the present disclosure, when the displayed text is turned over to a following text in response to an input of a user, the first electronic apparatus 400 may give a command to display an image corresponding to the following text to the second electronic apparatus. The command may include a page number corresponding to the following text or a page number including an image corresponding to the following text. By contrast, when a displayed image is turned over to a following image in response to an input of a user, the second electronic apparatus 410 may give a command to display text corresponding to the following image to the first electronic apparatus 400. That is, the first electronic apparatus 400 and the second electronic apparatus 410 may detect an input of a user, output pages corresponding to the detected input, and transmit a command about a page to be output or a page to be output to the counterpart electronic apparatus (the first electronic apparatus or the second electronic apparatus) at the same time or with a time difference.

For example, when the first electronic apparatus 400 detects an input, such as a gesture including a drag and a flick, for turning a page, the first electronic apparatus may display a following page or a previous page of a currently displayed page. Together with this, the second electronic apparatus 6410 may detect a change of the first electronic apparatus, and display a following page or a previous page of a currently displayed page. For example, when the first electronic apparatus 400 receives a scroll input for moving to a following page while displaying page 1, the first electronic apparatus 400 may display page 3. The second electronic apparatus 410 may display page 4 in response to the scroll input of the first electronic apparatus while displaying page 2. The first electronic apparatus and the second electronic apparatus may transceive and share the input received from the user with each other.

Figure 7A:
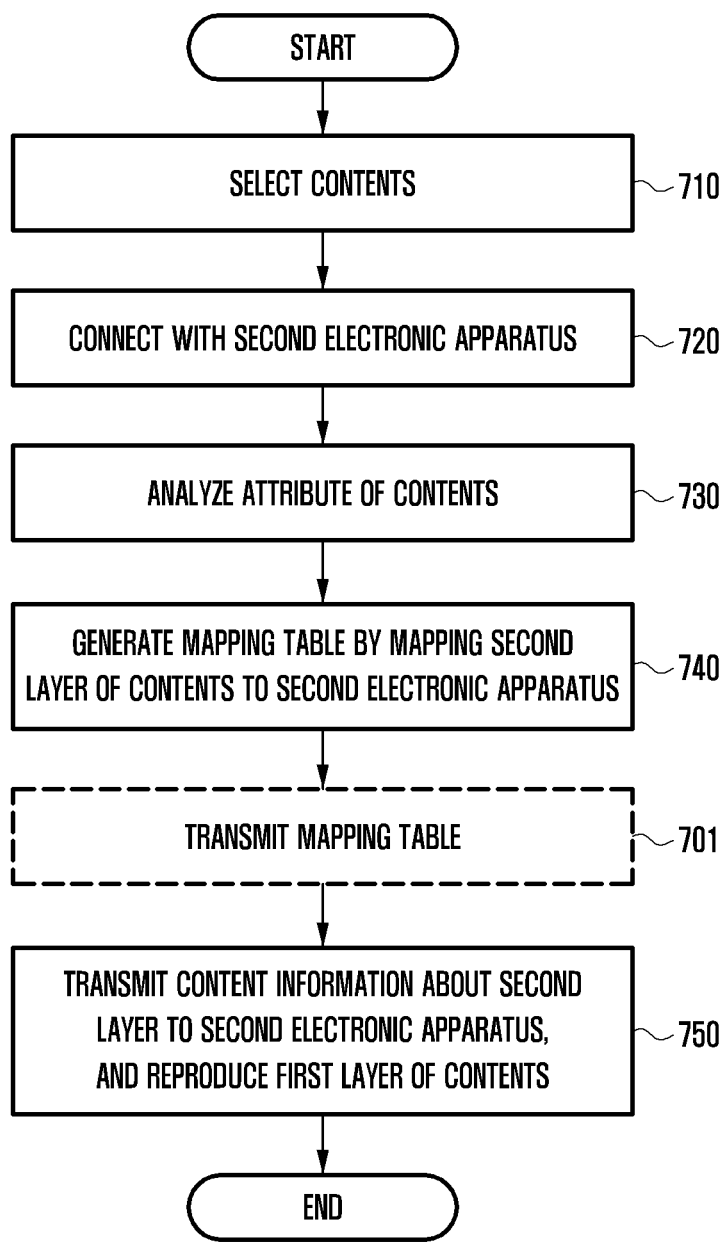
FIGS. 7A and 7B illustrate a process of reproducing contents by mapping the contents for each layer of the contents according to various embodiments of the present disclosure.
Figure 7B:
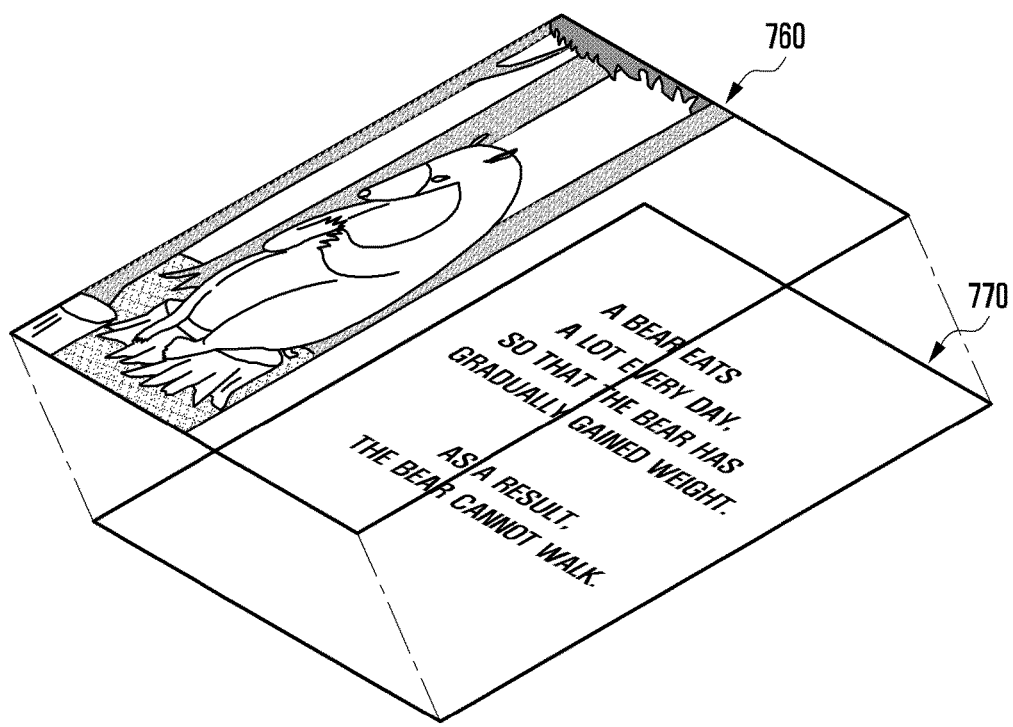

FIGS. 7A and 7B are diagrams illustrating a process of reproducing contents by mapping the contents for each layer of the contents according to various embodiments of the present disclosure.

FIG. 7B illustrates an image of contents divided into layers for the same contents and electronic apparatuses output the layers, respectively. For example, when contents are displayed by one electronic apparatus, an image layer 760 including a bear and a text layer 770 displaying text may be displayed together to configure one image. However, when the contents are displayed by two electronic apparatuses, the contents may be divided into two layers, and an image layer 760 may be output by the second electronic apparatus 410 and a text layer 770 may be output by the first electronic apparatus 400. The second electronic apparatus 410 is watched by a child who is a second user, and the first electronic apparatus 400 is watched by an adult who is a first user.

Hereinafter, a method of displaying an image illustrated in FIG. 7B will be described with reference to FIG. 7A.

Referring to FIG. 7A, in operation 710, the first electronic apparatus may receive a selection of contents corresponding to "Ebook, Fat Bear" 510 of FIG. 5A. In operation 720, the first electronic apparatus may be connected with the second electronic apparatus. The connection method is performed similar to the method illustrated in FIG. 4C. In operation 730, the first electronic apparatus may analyze an attribute of the selected contents. In operation 740, the first electronic apparatus may generate a mapping table by mapping a first layer of the contents to the first electronic apparatus itself and a second layer of the contents to the second electronic apparatus.

In operation 701, the first electronic apparatus may transmit the mapping table to the second electronic apparatus. Otherwise, the first electronic apparatus may not transmit the mapping table.

In operation 750, the first electronic apparatus may transit content information about the second layer to the second electronic apparatus, and reproduce the first layer of the contents.

Figure 8A:
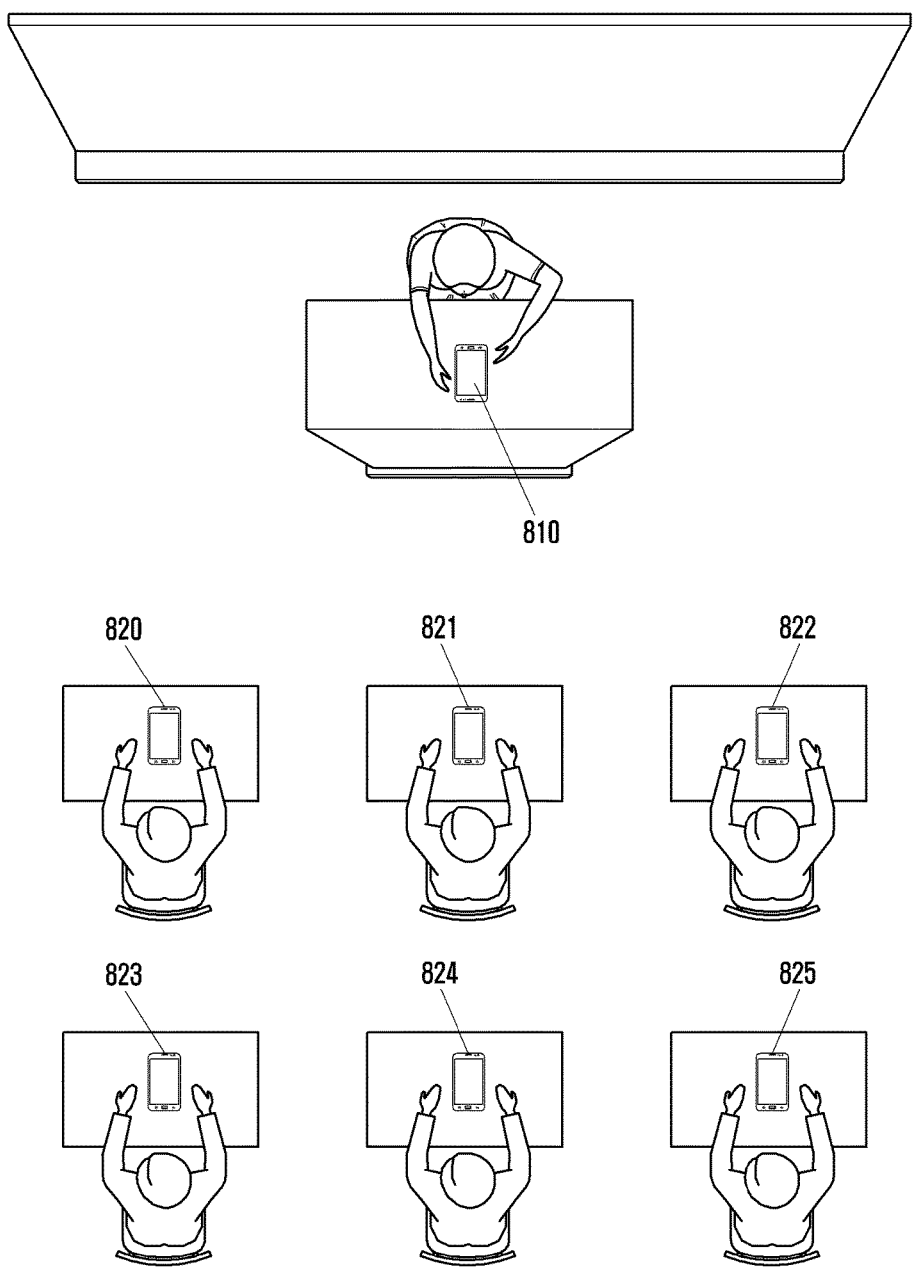

FIGS. 8A to 8C are diagrams illustrating an operation of outputting the same contents to a plurality of second electronic apparatuses according to various embodiments of the present disclosure.

FIG. 8A is an example in which the same contents are output to a plurality of second electronic apparatuses, and may illustrate the case related to a study book illustrated in FIG. 8B. For example, reference numeral 810 denotes a first electronic apparatus viewed by a teacher, and reference numerals 820, 821, 822, 823, 824, and 825 denote a plurality of second electronic apparatuses viewed by students. The plurality of second electronic apparatuses may include a first of second electronic apparatus 820, a second of second electronic apparatus 821, and a third of second electronic apparatus 822, a fourth of second electronic apparatus 823, a fifth of second electronic apparatus 824, and a sixth of second electronic apparatus 825.

FIG. 8B illustrates one example in which different contents are displayed in the second electronic apparatus of the student (second user) and the first electronic apparatus 810 of the teacher (first user). Reference numeral 830 refers to a screen of the second electronic apparatus, and the second electronic apparatus may display a problem page (Problem: A eats $\frac{1}{5}$ of the cheese . . . ) related to the study book. Further, reference numeral 840 refers to a screen of the first electronic apparatus, and the first electronic apparatus may display an answer page (Answer: 1) $\frac{4}{5} \times \frac{4}{9} = \frac{16}{45}$ . . . ) related to the problem page.

Hereinafter, a method of displaying an image illustrated in FIG. 8B will be described with reference to FIG. 8C.

Referring to FIG. 8C, in operation 801, the first electronic apparatus may receive a selection of contents corresponding to "Ebook, Math Workbook" 530 of FIG. 5A. In operation 802, the first electronic apparatus may be connected with the second electronic apparatus. The connection method is performed similar to the method illustrated in FIG. 4C. In operation 803, the first electronic apparatus may receive the type of each apparatus from the plurality of second electronic apparatuses (for example, the second electronic apparatuses 820 to 825). The type of apparatus may be an attribute of the region of the contents to which the second electronic apparatus belongs, or be information about the region of the contents which the second electronic apparatus desires to receive. Here, the contents are the study book, so that the type of apparatus of the plurality of second electronic apparatuses may be information about a region to which the problem page belongs.

In operation 804, the first electronic apparatus may analyze an attribute of the selected contents. For example, the first electronic apparatus may analyze that the study book is formed of a total of 150 pages, the problem pages are pages 1 to 100, and the answer pages are pages 101 to 150. In operation 805, the first electronic apparatus may generate the mapping table by mapping the second region of the contents to the plurality of second electronic apparatuses based on the attribute of the contents and the type of apparatus. According to the mapping table, page 101 may be divided into a first region, and the problem page related to page 101 may be divided into a second region with pages 1 to 3, and the first region may be mapped to the first electronic apparatus, and the second region may be mapped to the second electronic apparatus.

In operation 806a, the first electronic apparatus may transmit the mapping table to the first of second electronic apparatus (for example, the second electronic apparatus 820 of FIG. 8A). In operation 806b, the first electronic apparatus may transmit the mapping table to the second of second electronic apparatus (for example, the second electronic apparatus 821 of FIG. 8A). In operation 806c, the first electronic apparatus may transmit the mapping table to the third of second electronic apparatus (for example, the second electronic apparatus 822 of FIG. 8A). In operations 806a, 806b, and 806c, when the mapping table is not completely generated, the first electronic apparatus may not transmit the mapping table to the respective second electronic apparatus 820, 821, 822.

In operation 807, the first electronic apparatus may transmit content information about the second region to the first of second electronic apparatus 820. In operation 808, the first electronic apparatus may transmit the content information about the second region to the second of second electronic apparatus 821. In operation 809, the first electronic apparatus may transmit the content information about the second region to the third of second electronic apparatus 822. In operation 811, the first electronic apparatus 810 may display the first region of the contents. The first electronic apparatus may simultaneously perform operations 807 to 809 and operation 811, first perform operations 807 to 809 and then perform operation 811, or first perform operation 811 and then perform operations 807 to 809.

According to various embodiments of the present disclosure, page 101 may include a first region (for example, an upper end) corresponding to page a second region (for example, a center part) corresponding to page 2, and a third region (for example, a lower end) corresponding to page 3. The first to third regions may have the same size or different sizes. When the first electronic apparatus 810 displays the first region of answer page 101 according to the input of the teacher, the plurality of second electronic apparatuses 820-825 may display page 1. When the first electronic apparatus 810 detects an input of a gesture, for example, a drag and a flick, for turning the answer page, the first electronic apparatus may display the second region of answer page 101. Further, the second electronic apparatus may detect a change of the first electronic apparatus and display page 2.

According to various embodiments of the present disclosure, even though the first electronic apparatus opens another page in a form of a pop-up window, the plurality of second electronic apparatuses may maintain the existing page as it is. For example, when the first electronic apparatus displays a document, such as a PowerPoint (PPT) document, in connection with the plurality of second electronic apparatuses, the plurality of second electronic apparatuses may maintain the existing page even though the first electronic apparatus opens an auxiliary diagram, an auxiliary link, and the like. The first electronic apparatus may add a reference to the contents, and directly search for a corresponding page by using the reference.

It is possible to improve content usability for a plurality of users having different needs by providing a synchronized service for one content.

Figure 9A:
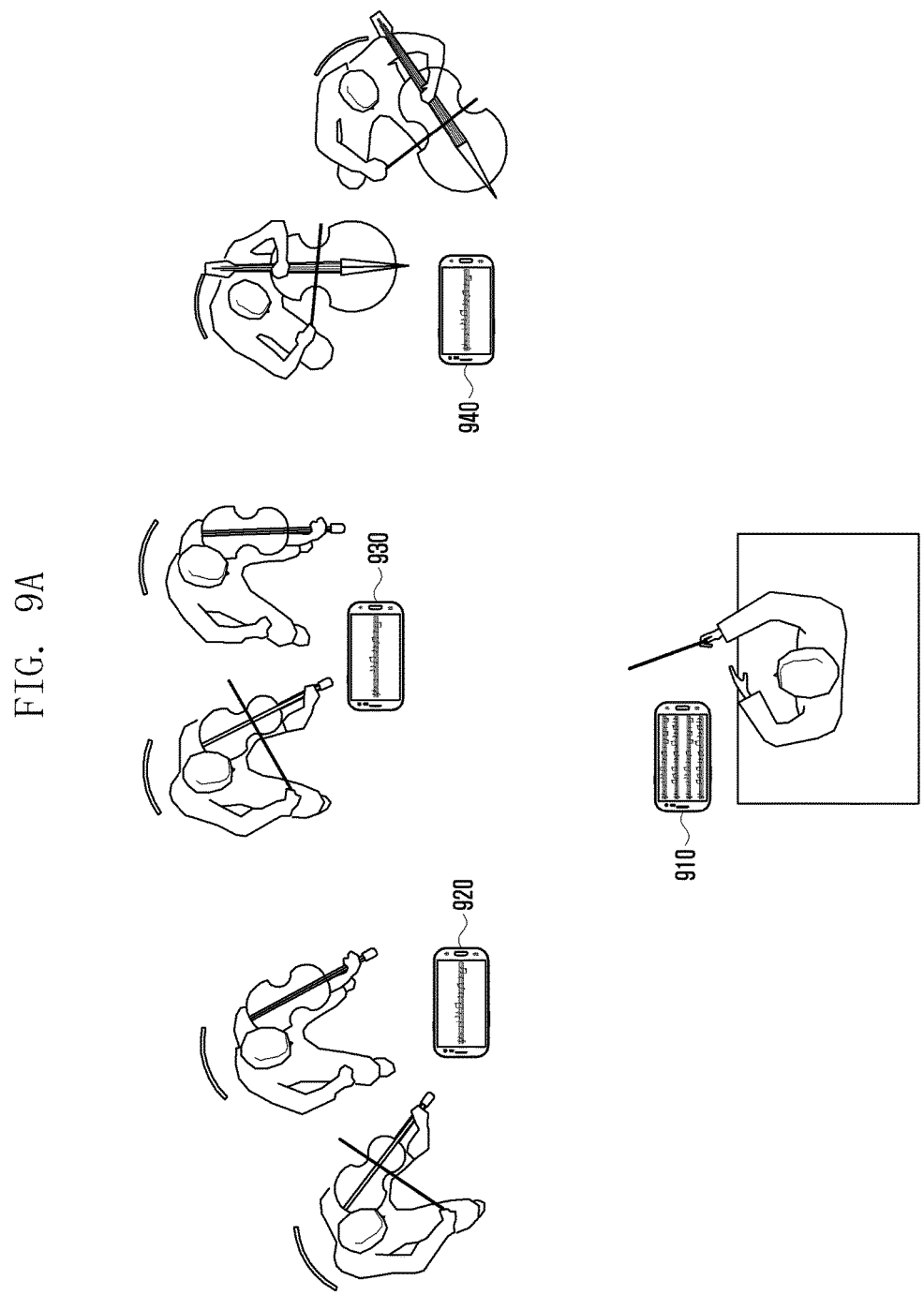
FIGS. 9A to 9C illustrate a process of outputting different contents to a plurality of second electronic apparatuses according to various embodiments of the present disclosure.
Figure 9B:
Figure 9B:
Figure 9C:
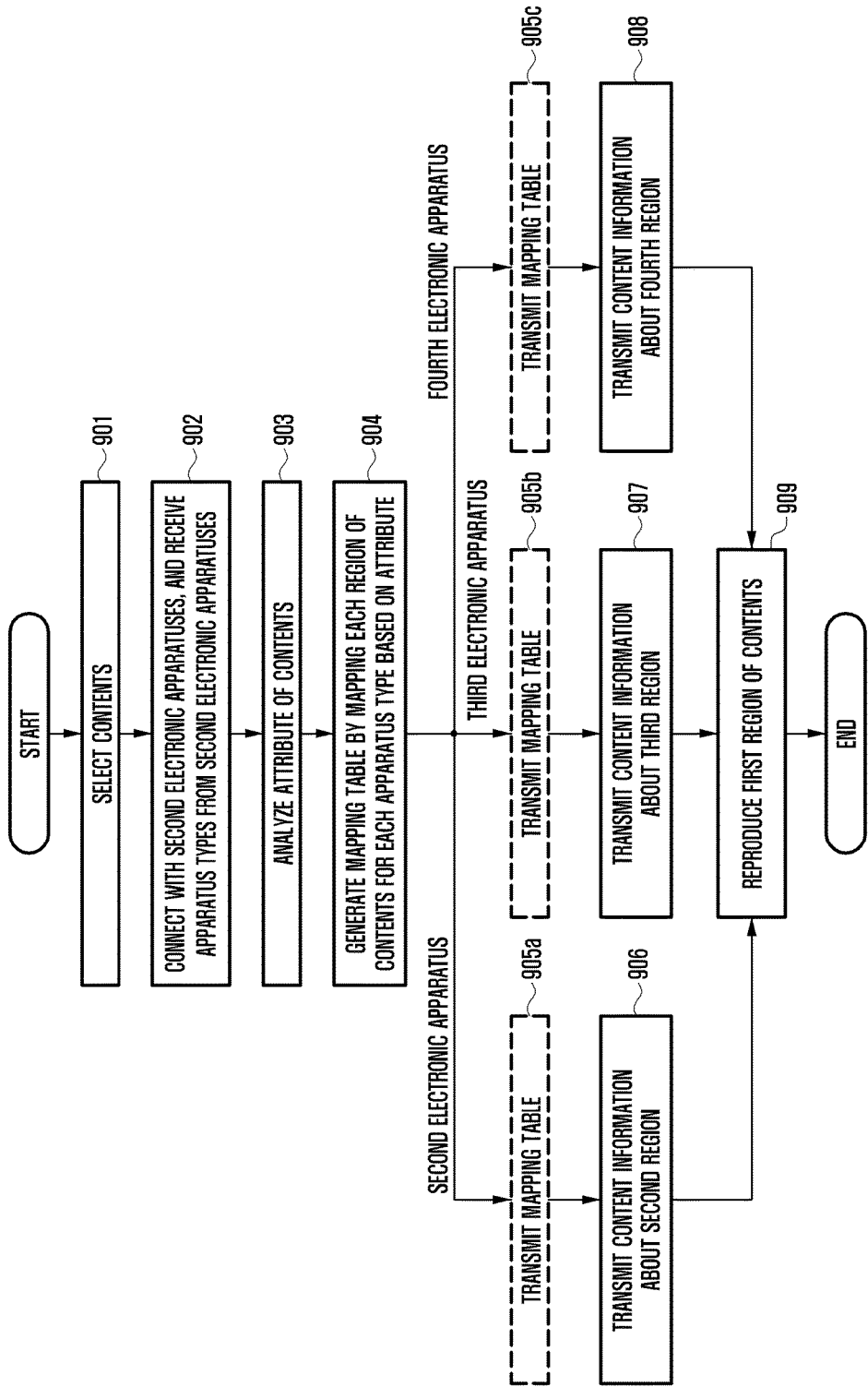

FIGS. 9A to 9C illustrate a process of outputting different contents to a plurality of second electronic apparatuses according to various embodiments of the present disclosure.

FIG. 9A is an example in which different contents are output to a plurality of second electronic apparatuses, and may illustrate the case related to an orchestra music score illustrated in FIG. 9B. For example, reference numeral 910 denotes a first electronic apparatus watched by a conductor, and reference numerals 920, 930, and 940 denote a plurality of second electronic apparatuses watched by musical performers. The plurality of second electronic apparatuses 920 to 940 may include a second electronic apparatus 920, a third electronic apparatus 930, and a fourth electronic apparatus 940. The second electronic apparatus 920 is an electronic apparatus of a musical performer playing violin 1 of the music score, the third electronic apparatus 930 is an electronic apparatus of a musical performer playing violin 2 of the music score, and the fourth electronic apparatus 940 is an electronic apparatus of a musical performer playing cello of the music score.

FIG. 9B illustrates one example in which different contents are displayed in the first electronic apparatus of the conductor (first user) and the second electronic apparatus of the musical performer (second user). Reference numeral 910a refers to a screen of the first electronic apparatus 910, and the first electronic apparatus 910 may display a full music score viewed by the conductor in relation to orchestra performance (Eine Kleine Nachtmusik K. 525 by Mozart). Further, reference numeral 920a refers to a screen of the second electronic apparatus 920, and the second electronic apparatus 920 may display a music score viewed by the musical performer. For example, the full music score 910a may include all of the music scores for violin 1 911, violin 2 912, and the cello 913. Among them, the music score corresponding to violin 1 may be transmitted to the second electronic apparatus 920a of the musical performer playing violin 1.

Hereinafter, a method of displaying an image illustrated in FIG. 9B will be described with reference to FIG. 9C.

Referring to FIG. 9C, in operation 901, the first electronic apparatus 910 may receive a selection of contents corresponding to "Composer, Eroica Symphony" 520 of FIG. 5A. In operation 902, the first electronic apparatus 910 may be connected with the plurality of second electronic apparatuses 920-940, and receive the type of apparatus from the plurality of second electronic apparatuses 920-940. The connection and receiving method is performed similar to the method illustrated in FIG. 4C. The type of apparatus may be an attribute of the region of the contents to which the second electronic apparatus belongs, or be information about the region of the contents which the second electronic apparatus desires to receive. In this example, the contents are the orchestra music score, so that the type of apparatus of the plurality of second electronic apparatuses may be information about a musical instrument. In this example, the plurality of second electronic apparatuses may include the second electronic apparatus 920, a third electronic apparatus 930, and a fourth electronic apparatus 940.

In operation 903, the first electronic apparatus 910 may analyze an attribute of the selected contents. For example, the first electronic apparatus 910 may analyze that the orchestra music score book is formed of a total of 400 pages, pages 1 to 100 are a full music score including all of the music scores for musical instruments, pages 101 to 200 are a music score corresponding to violin 1, pages 201 to 300 are a music score corresponding to violin 2, and pages 301 to 400 are a music score corresponding to the cello operation 904, the first electronic apparatus 910 may generate the mapping table by mapping the second region, third region, and fourth region of the contents to the plurality of second electronic apparatuses 920-940 based on the attribute of the contents and the type of apparatus. The second region may be divided into a second region, a third region, and a fourth region according to a musical instrument.

The first electronic apparatus 910 may classify "violin 1" that is a first musical instrument into the second region, "violin 2" that is a second musical instrument into the third region, and a "cello" that is a third musical instrument into the fourth region. For example, pages 1 to 10 may be the first region, page 101 may be the second region, page 201 may be the third region, and page 301 may be the fourth region. Pages 11 to 20 may be the first region, page 102 may be the second region, page 202 may be the third region, and page 302 may be the fourth region. The first electronic apparatus 910 may generate the mapping table by mapping the first region to the first electronic apparatus 910 itself, and mapping the second region to the second electronic apparatus 920, the third region to the third electronic apparatus 930, and the fourth region to the fourth electronic apparatus 940. For example, as represented by Table 4, the first region of the mapping table may be page numbers of the full music score, the second region may be page numbers of the music score related to violin 1, the third region may be page numbers of the music score related to violin 2, and the fourth region may be page numbers of the music score related to the cello.

In operation 905*a*, the first electronic apparatus 910 may transmit or may not transmit the mapping table to the second electronic apparatus (for example, the second electronic apparatus 920 of FIG. 9A). In operation 905*b*, the first electronic apparatus may transmit or may not transmit the mapping table to the third electronic apparatus (for example, the second electronic apparatus 930 of FIG. 9A). In operation 905*c*, the first electronic apparatus may transmit or may not transmit the mapping table to the fourth electronic apparatus (for example, the second electronic apparatus 940 of FIG. 9A).

In operation 906, the first electronic apparatus may transmit content information about the second region to the second electronic apparatus. In operation 907, the first electronic apparatus may transmit content information about the third region to the third electronic apparatus, in operation 908, the first electronic apparatus may transmit content information about the fourth region to the fourth electronic apparatus. In operation 909, the first electronic apparatus may reproduce the first region of the contents. The first electronic apparatus may simultaneously perform operations 906 to 908 and operation 909, first perform operations 906 to 908 and then perform operation 909, or first perform operation 909 and then perform operations 906 to 908.

According to various embodiments of the present disclosure, when the first electronic apparatus detects a page turning input (for example, a gesture) by a hand of a user or other means (for example, an electronic pen), the first electronic apparatus may display a music score corresponding to the input. In addition, the first electronic apparatus may transmit content information to direct a display of the music score corresponding to the input to the second to fourth electronic apparatuses. Otherwise, even though the music score is not turned through the hand of the user or other means, the first electronic apparatus may analyze a sound performed through a microphone, and recognize a main melody. That is, when the first electronic apparatus recognizes that one page of the music score is turned over by confirming a measure of the music score related to the sound through the analyzed sound, the first electronic apparatus may transmit a command to display a page related to the turned page to the second to fourth electronic apparatuses. To this end, the first electronic apparatus may transmit content information about the measure to the second to fourth electronic apparatuses. The second to fourth apparatuses may display the music score related to the measure by using the information related to the measure.

Figure 10A:
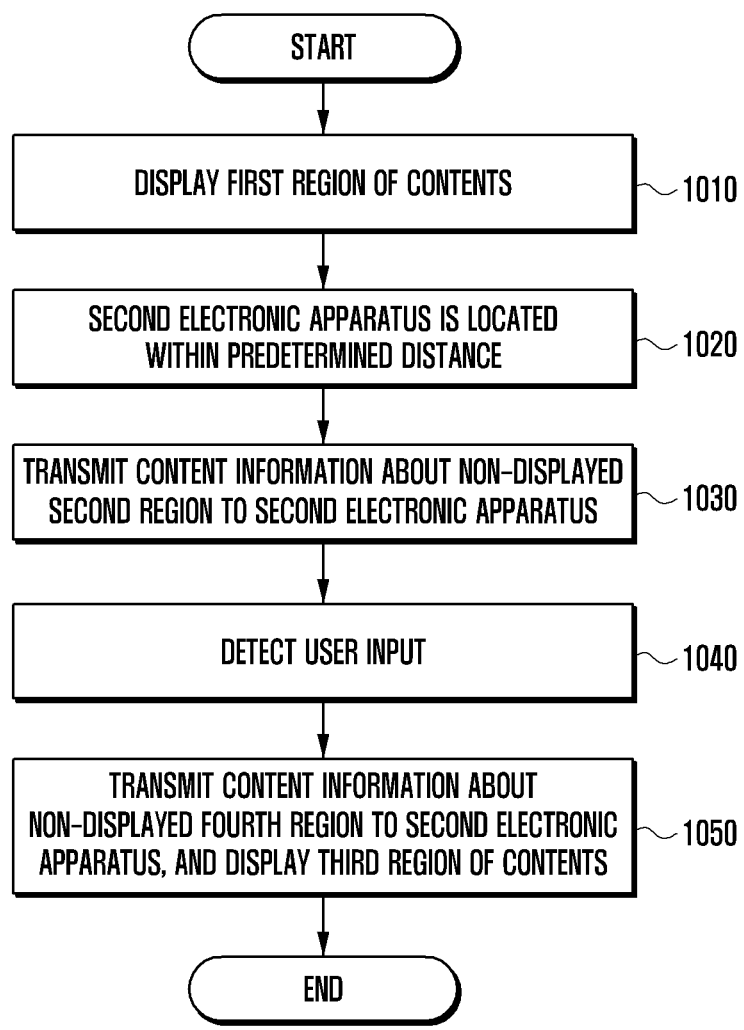
FIGS. 10A and 10B illustrate a process of displaying contents according to various embodiments of the present disclosure.
Figure 10C:
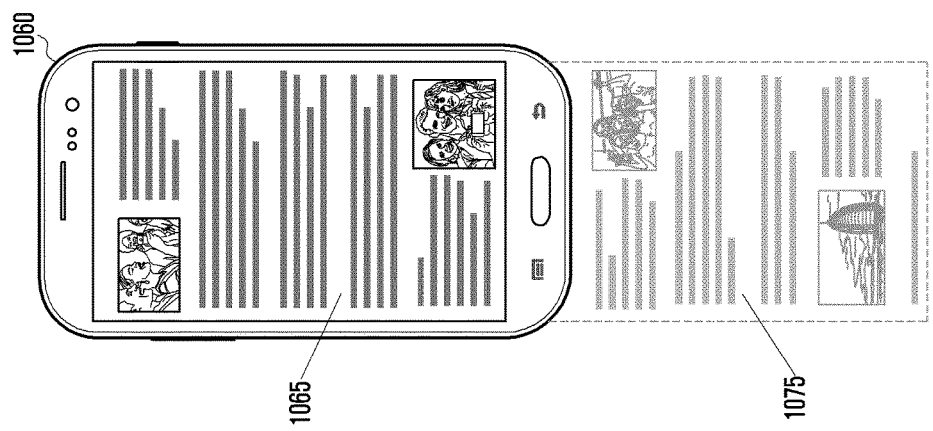
FIG. 10C illustrates a different system displaying contents according to a scroll bar move.
Figure 10B:
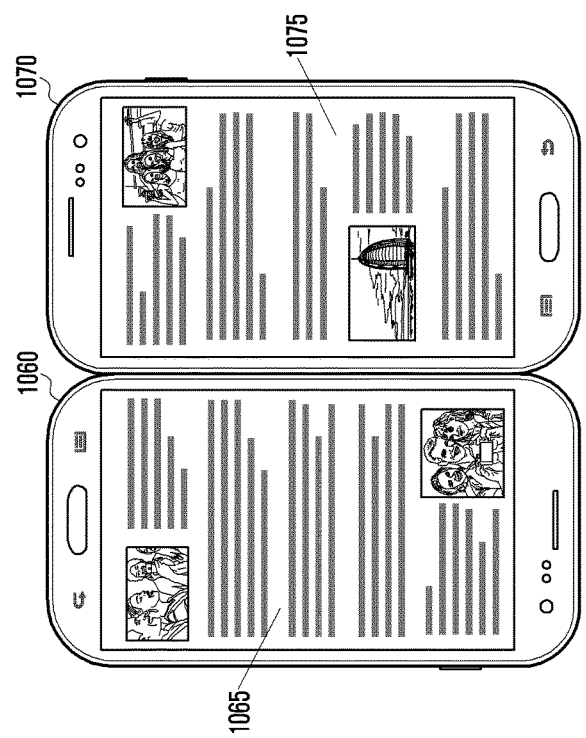

FIGS. 10A and 10B illustrate a process of displaying contents according to various embodiments of the present disclosure.

FIG. 10A illustrates an example in which a second region of contents, which is not displayed in a display unit, is displayed in the second electronic apparatus (the external electronic apparatus 104 of FIG. 1) while a first region of the contents is displayed on a display unit (the display 150 of FIG. 1 or the display unit 230 of FIG. 2) of a first electronic apparatus (the electronic apparatus 101 of FIG. 1 and the electronic apparatus 200 of FIG. 2). In the embodiment of FIG. 10A, the electronic apparatuses are connected by a slightly different method from that of the embodiment of FIG. 3. For example, a first electronic apparatus may be in contact with a second electronic apparatus, or a distance between a first electronic apparatus and a second electronic apparatus may be shorter than the predetermined distance of the embodiment of FIG. 3.

In operation 1010, the first electronic apparatus may display a first region of contents. For example, the contents are formed of the first region and a second region associated with the first region, and the first electronic apparatus may display only the first region due to a limit in a size of the display unit. In the related art, in order to view the second region, a first user of the first electronic apparatus may make an input of moving a scroll bar in an up, down, left, or right direction, so that the second region is displayed on the display unit. However, in the present disclosure, the second region may be controlled to be displayed through a second electronic apparatus connected with the first electronic apparatus.

In operation 1020, the first electronic apparatus may be positioned within a predetermined distance from the second electronic apparatus. The first electronic apparatus may be in a state of being connected with the second electronic apparatus. The first electronic apparatus is connected with the second electronic apparatus to transceive data with the second electronic apparatus. The first electronic apparatus may communicate with the second electronic apparatus by any one method of the DLNA, Allshare, and miracast of WIFI Direct. Otherwise, the first electronic apparatus may communicate with the second electronic apparatus by Bluetooth or an NIT method.

In operation 1030, the first electronic apparatus may transmit content information about the second region, which is not displayed on the display unit, to the second electronic apparatus. In order to transmit the second region, which is not displayed on the display unit, to the second electronic apparatus, the first electronic apparatus may also generate a mapping table as described with reference to FIGS. 2 and 3. Otherwise, the first electronic apparatus may not generate the mapping table, and may transmit the content information about the second region, which is not displayed on the display unit, to the second electronic apparatus.

For example, when the first electronic apparatus transmits the mapping table to the second electronic apparatus in advance, the first electronic apparatus may transmit a reference number associated with the second region to the second electronic apparatus as the content information about the second region. Otherwise, the first electronic apparatus may also transmit the second region of the contents to the second electronic apparatus as the content information about the second region. The second electronic apparatus may display the second region of the contents while the first electronic apparatus displays the first region of the contents.

In operation 1040, the first electronic apparatus may detect a user input. The user input may be a gesture, for example, a drag and a flick, for turning a page. Otherwise, the input may be an input of bending, rotating, or fast turning the page, and the like.

In operation 1050, the first electronic apparatus may display a third region of the contents in response to the user input, and transmit content information about a fourth region, which is not displayed, to the second electronic apparatus. For example, the contents may further sequentially include a third region and a fourth region in addition to the first region and the second region. In the related art, in order to view the third region, the first user of the first electronic apparatus may make an input of moving a scroll bar in an up, down, left, or right direction, so that the second region and the third region are sequentially displayed on the display unit.

However, in the present disclosure, the second region is displayed through the second electronic apparatus connected with the first electronic apparatus, so that the first electronic apparatus may display the first region and then immediately display the third region. When the first electronic apparatus displays the third region of the contents, the fourth region of the contents is not displayed on the display unit. The first electronic apparatus transmits content information about the fourth region, which is not displayed, to the second electronic apparatus, so that the second electronic apparatus may display the fourth region of the contents. As described above, the second electronic apparatus may detect a change of the first electronic apparatus to display a page, which is not currently displayed through the first electronic apparatus.

FIG. 10B illustrates an image in which in a situation where two electronic apparatuses are positioned within a predetermined distance, contents displayed through the two different electronic apparatuses are synchronized and displayed. The two electronic apparatuses provide an environment in which a user may use the two electronic apparatuses in a form a book being read by the user.

When contents including a first region 1065 and a second region 1075 are displayed, one first electronic apparatus 1060 (the electronic apparatus 101 of FIG. 1, and the electronic apparatus 200 of FIG. 2) may display only the first region 1065 due to a limit in a size of a display unit. In a different system as shown in FIG. 10C, in order to view the second region 1075, a first user of the first electronic apparatus 1060 mikes an input of moving a scroll bar in a down direction, so that the second region 1075 is displayed on a first display unit of the first electronic apparatus 1060. However, in embodiments according to the present disclosure as shown in FIG. 10B, the second region 1075 may be controlled to be displayed through a second electronic apparatus 1070 connected with the first electronic apparatus 1060.

The second electronic apparatus 1070 may be positioned within a predetermined distance from the first electronic apparatus 1060 to be communicably connected with the first electronic apparatus 1060. That is, in FIG. 10B in which the first electronic apparatus 1060 and the second electronic apparatus 1070 are illustrated in parallel, when scrolling in the down direction is input into the first electronic apparatus 1060, the second electronic apparatus 1070 recognizes the input and is synchronized with the first electronic apparatus 1060 while displaying a lower portion of the contents through pairing. When the scrolling in the down direction is input into the first electronic apparatus 1060 while displaying the first region 1065, the first electronic apparatus 1060 may display a third region (not shown) that is a following page of the second region 1075. The second electronic apparatus 1070 may display a fourth region (not shown) which is connected with the third region and is not displayed in the first electronic apparatus 1060.

A method of providing contents by using an electronic apparatus according to various embodiments of the present disclosure may include: analyzing an attribute of contents and generating a mapping table by mapping a first region of the contents and a second region of the contents associated with the first region; and transmitting contents information about the second region related to the mapping table to a second electronic apparatus and outputting the first region of the contents through an output unit.

The generating may include analyzing at least one of the type of data included in the contents, a page number of the contents, a layer of the contents, and the number of measures of the contents as the attribute of the contents.

The generating may include an operation of performing at least one of obtaining the attribute of the contents from the contents, analyzing the contents and generating the attribute of the contents, or receiving a setting of the attribute of the contents from a user.

The generating may include: receiving a selection of the contents; detecting whether the electronic apparatus is connected with the second electronic apparatus; and generating the mapping table by mapping the first region of the contents or the second region of the contents to the connected second electronic apparatus based on the attribute of the selected contents.

The generating may include: receiving the type of each apparatus from each second electronic apparatus when the number of connected second electronic apparatuses is two or more; and generating the mapping table by mapping the first region of the contents or the second region of the contents to the connected second electronic apparatus based on the attribute of the contents and the type of each apparatus.

The generating may include: analyzing a musical instrument included in a music score when the contents are related to the music score; receiving the type of apparatus from each of a plurality of second electronic apparatuses; and generating the mapping table by mapping each second electronic apparatus with the analyzed musical instrument of the music score based on the type of each apparatus.

The outputting may include: analyzing a sound and confirming a measure of the music score related to the sound; and transmitting content information about the measure to each second electronic apparatus and displaying the music score related to the measure through the display unit.

The method may further include transmitting the mapping table to the second electronic apparatus.

The outputting may farther include displaying the first region of the contents on the display unit, and transmitting content information about the second region, which is not displayed on the display unit, to the second electronic apparatus when the second electronic apparatus is located within a predetermined distance.

The outputting may include: detecting a user input; and displaying a third region of the contents on the display unit in response to the user input, and transmitting content information about a fourth region, which is not displayed on the display unit, to the second electronic apparatus.

Figure 11:
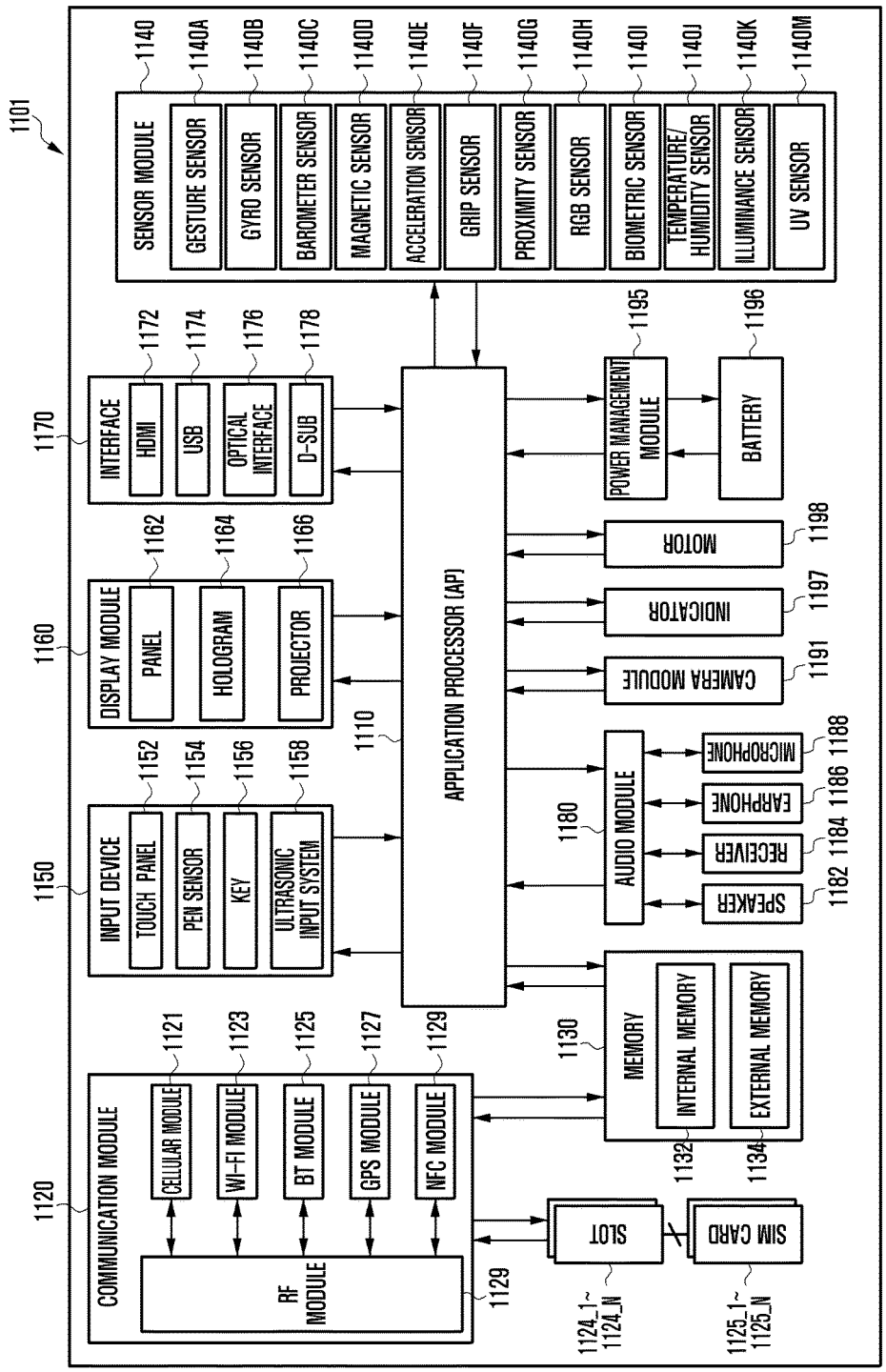
FIG. 11 illustrates an electronic apparatus according to various embodiments of the present disclosure.

FIG. 11 illustrates an electronic device 1101 in accordance with embodiments of the present disclosure. The electronic device 11101 may be, for example, the whole or part of the electronic device 101 shown in FIG. 1 or the electronic device 200 in FIG. 2. Referring to FIG. 11, the electronic device 1101 includes at least one application processor (AP) 1110, a communication module 1120, a subscriber identification module (SIM) card 1124, a memory 1130, a sensor module 1140, an input unit 1150, a display module 1160, an interface 1170, an audio module 1180, a camera module 1191, a power management module 1195, a battery 1196, an indicator 1197, and a motor 1198.

The AP 1110 drives an operating system or applications, controls a plurality of hardware or software components connected thereto, and also performs processing and operation for various data including multimedia data. The AP 1110 may be formed as a system-on-chip (SoC), for example. According to embodiments of the present disclosure, the AP 1110 may further include a GPU.

The communication module 1120 (e.g., the communication interface 160) performs data communication with any other electronic device (e.g., the electronic device 104 or the server 106) connected to the electronic device 1101 (e.g., the electronic device 101) through the network. According to embodiments of the present disclosure, the communication module 1120 may include therein a cellular module 1121, a WiFi module 1123, a BT module 1125, a GPS module 1127, an NFC module 1128, and a Radio Frequency (RF) module 1129.

The cellular module 1121 offers a voice call, a video call, a message service, an interact service, or the like through a communication network (e.g., LTE, LTE-A, CDMA, WCDMA, UMTS, WiBro, or GSM, etc.). Additionally, the cellular module 1121 performs identification and authentication of the electronic device in the communication network, using the SIM card 1124. According to embodiments of the present disclosure, the cellular module 1121 may perform at least part of functions the AP 1110 can provide. For example, the cellular module 1121 may perform at least part of a multimedia control function.

According to embodiments of the present disclosure, the cellular module 1121 may include a communication processor (CP). Additionally, the cellular module 1121 may be formed of SoC, for example. Although some elements such as the cellular module 1121 (e.g., the CP), the memory 1130, or the power management module 1195 are shown as separate elements being different from the AP 1110 in FIG. 11, the AP 1110 may be formed to have at least part (e.g., the cellular module 1121) of the above elements in embodiments of the present disclosure.

According to embodiments of the present disclosure, the AP 1110 or the cellular module 1121 (e.g., the CP) loads commands or data, received from a nonvolatile memory connected thereto or from at least one of the other elements, into a volatile memory to process them. Additionally, the AP 1110 or the cellular module 1121 stores data, received from or created at one or more of the other elements, in the nonvolatile memory.

Each of the WiFi module 1123, the BT module 1125, the GPS module 1127 and the NFC module 1128 may include a processor for processing data transmitted or received therethrough. Although FIG. 11 shows the cellular module 221, the WiFi module 223, the BT module 225, the GPS module 1127 and the NFC module 1128 as different blocks, at least part of them may be contained in a single Integrated Circuit (IC) chip or a single IC package in embodiments of the present disclosure. For example, at least part (e.g., the CP corresponding to the cellular module 1121 and a WiFi processor corresponding to the WiFi module 1123) of respective processors corresponding to the cellular module 1121, the WiFi module 1123, the BT module 1125, the GPS module 1127 and the NFC module 1128 may be formed as a single SoC.

The RF module 1129 transmits and receives data, e.g., RF signals or any other electric signals. Although not shown, the RF module 1129 may include a transceiver, a Power Amp Module (PAM), a frequency filter, a Low Noise Amplifier (LNA), or the like. Also, the RF module 1129 may include any component, e.g., a wire or a conductor, for transmission of electromagnetic waves in a free air space. Although FIG. 11 shows that the cellular module 1121, the WiFi module 1123, the BT module 1125, the GPS module 1127 and the NFC module 1128 share the RF module 1129, at least one of them may perform transmission and reception of RF signals through a separate RF module in embodiments of the present disclosure.

The SIM card 1124 may be inserted into a slot formed at a certain place of the electronic device. The SIM card 1124 may contain therein an Integrated Circuit Card Identifier (ICCID) or an International Mobile Subscriber Identity (IMSI).

The memory 1130 (e.g., the memory 130) may include an internal or built-in memory 1132 and an external memory 1134. The internal or built-in memory 1132 may include, for example, at least one of a volatile memory (e.g., Dynamic Random Access Memory (RAM) (DRAM), Static RAM (SRAM), Synchronous DRAM (SDRAM), etc.) or a non-volatile memory (e.g., One Time Programmable Read Only Memory (ROM) (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.).

According to embodiments of the present disclosure, the intermit or built-in memory 1132 may have the form of a Solid State Drive (SSD). The external memory 1134 may include a flash drive, e.g., Compact Flash (CF), Secure Digital (SD), Micro Secure Digital (Micro-SD), Mini Secure Digital (Mini-SD), eXtreme Digital (xD), memory stick, or the like. The external memory 1134 may be functionally connected to the electronic device 1101 through various interfaces. According to embodiments of the present disclosure, the electronic device 1101 may further include a storage device or medium such as a hard drive.

The sensor module 1140 measures a physical quantity or senses an operating status of the electronic device 1101, and then converts measured or sensed information into electric signals. The sensor module 1140 may include, for example, at least one of a gesture sensor 1140A, a gyro sensor 1140B, an atmospheric sensor 1140C, a magnetic sensor 1140D, an acceleration sensor 1140E, a grip sensor 1140F, a proximity sensor 1140G, a color sensor 1140H (e.g., RGB (Red, Green, Blue) sensor), a biometric sensor 1140I, a temperature-humidity sensor 1140J, an illumination sensor 1140K, and an ultraviolet (LTV) sensor 1140M. Alternatively, the sensor module 1140 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 1140 may include a control circuit for controlling one or more sensors equipped therein.

The input unit 1150 may include a touch panel 1152, a digital pen sensor 1154, a key 1156, or an ultrasonic input unit 1158.

The touch panel 1152 recognizes a touch input in a manner of capacitive type, resistive type, infrared type, or ultrasonic type. Also, the touch panel 1152 may further include a control circuit. In case of a capacitive type, a physical contact or proximity may be recognized. The touch panel 1152 may further include a tactile layer. In this case, the touch panel 1152 may offer a tactile feedback to a user.

The digital pen sensor 1154 may be formed in the same or similar manner as receiving a touch input or by using a separate recognition sheet. The key 1156 may include, for example, a physical button, an optical key, or a keypad. The ultrasonic input unit 1158 is a specific device capable of identifying data by sensing sound waves with a microphone 1188 in the electronic device 1101 through an input tool that generates ultrasonic signals, thus allowing wireless recognition. According to embodiments of the present disclosure, the electronic device 1101 may receive a user input from any external device (e.g., a computer or a server) connected thereto through the communication module 1120.

The display 1160 (e.g., the display 150) may include a panel 1162, a hologram 1164, or a projector 1166. The panel 1162 may be, for example, Liquid Crystal Display (LCD), Active Matrix Organic Light Emitting Diode (AM-OLED), or the like. The panel 1162 may have a flexible, transparent or wearable form. The panel 1162 may be formed of a single module with the touch panel 1152. The hologram 1164 shows a stereoscopic image in the air using interference of light. The projector 1166 projects an image onto a screen, which may be located at the inside or outside of the electronic device 1101. According to embodiments of the present disclosure, the display 1160 may further include a control circuit for controlling the panel 1162, the hologram 1164, and the projector 1166.

The interface 1170 may include, for example, a High-Definition Multimedia Interface (HDMI) 1172, a Universal Serial Bus (USB) 1174, an optical interface 1176, or a D-subminiature (D-sub) 1178. The interface 1170 may be contained, for example, in the communication interface 160 shown in FIG. 1. Alternatively, the interface 1170 may include, for example, a Mobile High-definition Link (MHL) interface, a Secure Digital (SD) card/Multi-Media Card (MMC) interface, or an Infrared Data Association (IrDA) interface.

The audio module 1180 performs a conversion between sounds and electric signals. At least part of the audio module 1180 may be contained, for example, in the input/output interface 140 shown in FIG. 1. The audio module 1180 may process sound information inputted or outputted through a speaker 1182, a receiver 1184, an earphone 1186, or a microphone 1188.

The camera module 1191 is a device capable of obtaining still images and moving images. According to embodiments of the present disclosure, the camera module 1191 may include at least one image sensor (e.g., a front sensor or a rear sensor), a lens, an Image Signal Processor (ISP), or a flash (e.g., Light Emitting Diode (LED) or xenon lamp).

The power management module 1195 manages electric power of the electronic device 1101. The power management module 1195 may include, for example, a Power Management Integrated Circuit (PMIC), a charger IC, or a battery gauge.

The PMIC may be formed, for example, of an IC chip or an SoC. Charging may be performed in a wired or wireless manner. The charger IC may charge a battery 1196 and prevent overvoltage or overcurrent from a charger. According to embodiments of the present disclosure, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge measures the residual amount of the battery 1196 and a voltage, current or temperature in a charging process. The battery 1196 stores or creates electric power therein and supplies electric power to the electronic device 1101. The battery 1196 may be, for example, a rechargeable battery or a solar battery.

The indicator 1197 shows thereon a current status (e.g., a booting status, a message status, or a recharging status) of the electronic device 1101 or of its part (e.g., the AP 1110). The motor 1198 converts an electric signal into a mechanical vibration. Although not shown, the electronic device 1101 may include a specific processor (e.g., GPU) for supporting a mobile TV. This processor may process media data that comply with standards of Digital Multimedia Broadcasting (DMB), Digital Video Broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

According to various embodiments of the present disclosure, one content may be classified into two or more regions according to an attribute of the contents and be reproduced through a plurality of electronic apparatuses, so that it is possible to variously utilize one content according to a use purpose.

According to various embodiments of the present disclosure, One Source Multi Use (OSMU) contents may exhibit an effect, such as Adaptive Source Multi Device (ASMD), so that it is possible to divide and display necessary information for each electronic apparatus.

According to various embodiments of the present disclosure, it is possible to differently synchronize one content according to a necessity and provide the synchronized contents to a corresponding electronic apparatus.

According to various embodiments of the present disclosure, it is possible to provide contents of a smart TV linked with a portable terminal in a situation where killer contents of the smart TV are lacking by liking the portable terminal and another device, such as the smart TV.

According to various embodiments of the present disclosure, it is possible to create a base environment in which a new content ecosystem may be created through cooperation with contents-producing companies. Further, it is possible to apply and utilize existing supplied contents in various forms by minimally modifying the existing supplied contents or by using setting information of a user.

The embodiments disclosed in the present specifications and drawings were provided merely to readily describe and to help a thorough understanding of the present disclosure but not intended to limit the scope of the present disclosure. Therefore, it should be construed that all modifications or modified forms drawn by the technical idea of the present disclosure in addition to the embodiments disclosed herein are included in the scope of the present disclosure.

What is claimed is:

1. A method of providing contents by an electronic device, the method comprising:
    analyzing an attribute of contents;
    generating a mapping table for mapping a first region of the contents and a second region of the contents associated with the first region; and
    transmitting content information of the second region related to the mapping table to an electronic apparatus and displaying, via a display of the electronic device, the first region of the contents,
    wherein the content information of the second region, which is not displayed on the display of the electronic device, is displayed via a display of the electronic apparatus when the electronic apparatus when the electronic apparatus is located within a predetermined distance from the electronic device.

2. The method of claim 1, wherein the generating includes analyzing, as the attribute of the contents, at least one of:
    a type of data included in the contents,
    a page number of the contents,
    a layer of the contents, or
    a number of measures of the contents.

3. The method of claim 1, wherein the generating includes at least one of:
obtaining the attribute of the contents from the contents,
analyzing the contents and generating the attribute of the contents, or
receiving a setting of the attribute of the contents from a user.

4. The method of claim 1, wherein the generating includes:
receiving a selection of the contents;
detecting whether the electronic device is connected with the electronic apparatus; and
generating the mapping table by mapping one of: the first region of the contents or the second region of the contents to the connected electronic apparatus based on an attribute of the selected contents.

5. The method of claim 4, wherein the generating includes:
when the electronic apparatus includes two or more electronic apparatuses connected to the electronic device, receiving a type of apparatus from each of the electronic apparatuses; and
generating the mapping table by mapping one of: the first region of the contents or the second region of the contents to each of the connected electronic apparatuses based on an attribute of the contents and the type of each connected electronic apparatus.

6. The method of claim 1, wherein the generating includes:
when the contents are related to a music score, analyzing a musical instrument included in the music score;
receiving a type of apparatus from each electronic apparatus connected to the electronic device; and
generating the mapping table by mapping each connected electronic apparatus with the analyzed musical instrument of the music score based on the type of each electronic apparatus.

7. The method of claim 6, further comprising:
analyzing a sound and confirming a measure of the music score related to the sound; and
transmitting content information about the measure to each connected electronic apparatus and displaying the music score related to the measure through the display of the electronic device.

8. The method of claim 1, further comprising:
transmitting the mapping table to the electronic apparatus.

9. The method of claim 1, further comprising:
detecting a user input; and
displaying a third region of the contents on the display of the electronic device in response to the user input, and transmitting content information of a fourth region, which is not displayed on the display of the electronic device, to the electronic apparatus.

10. An electronic device comprising:
a communication circuit;
a display; and
at least one processor configured to:
analyze an attribute of contents,
generate a mapping table for mapping a first region of the contents and a second region of the contents associated with the first region,
transmit, via the communication circuit, content information of the second region related to the mapping table to an electronic apparatus, and
display, via the display of the electronic device, the first region of the contents,
wherein the content information of the second region, which is no displayed on the display of the electronic device, is displayed via a display of the electronic apparatus when the electronic apparatus is located within a predetermined distance from the electronic device.

11. The electronic device of claim 10, wherein the at least one processor is configured to analyze, as the attribute of the contents, at least one of:
a type of data included in the contents,
a page number of the contents,
a layer of the contents, and
a number of measures of the contents.

12. The electronic device of claim 10, wherein the at least one processor is further configured to at least one of:
obtain the attribute of the contents from the contents,
analyze the contents and generate the attribute of the contents, or
receive a setting of the attribute of the contents from a user.

13. The electronic device of claim 10, further comprising:
an input module configured to receive a selection of the contents,
wherein the at least one processor is configured to:
detect whether the electronic device is connected with the electronic apparatus; and
generate the mapping table by mapping one of: the first region of the contents or the second region of the contents to the connected electronic apparatus based on an attribute of the selected contents.

14. The electronic device of claim 13, wherein the at least one processor is configured to:
receive, via the communication circuit, when the electronic apparatus includes two or more electronic apparatuses connected to the electronic device, a type of apparatus from each of the electronic apparatuses, and
generate the mapping table by mapping one of: the first region of the contents or the second region of the contents to each of the connected electronic apparatuses based on an attribute of the contents and the type of each connected electronic apparatus.

15. The electronic device of claim 10, wherein the at least one processor is configured to:
analyze a musical instrument included in a music score when the contents are related to the music score,
receive, via the communication circuit, a type of apparatus from each electronic apparatus connected to the electronic device, and
generate the mapping table by mapping each connected electronic apparatus with the analyzed musical instrument of the music score based on the type of each electronic apparatus.

16. The electronic device of claim 15, wherein the at least one processor is configured to:
analyze a sound and confirms a measure of the music score related to the sound,
transmit, via the communication circuit, content information about the measure to each electronic apparatus, and
display, via the display, the music score related to the measure.

17. The electronic device of claim 10, wherein the at least one processor is configured to transmit, via the communication circuit, the mapping table to the electronic apparatus.

18. The electronic device of claim 10, wherein the at least one processor is configured to:
detect a user input, display, via the display, a third region of the contents in response to the user input, and the transmit, via the communication circuit, content information about a fourth region, which is not displayed on the display, to the electronic apparatus.

* * * * *